US012790890B2

(12) United States Patent
Kirby et al.

(10) Patent No.: US 12,790,890 B2
(45) Date of Patent: *Nov. 10, 2026

(54) INTEGRATED ACCESSIBLE BATTERY COMPARTMENT FOR MOTORIZED WINDOW TREATMENT

(71) Applicant: Lutron Technology Company LLC, Coopersburg, PA (US)

(72) Inventors: David A. Kirby, Zionsville, PA (US); Samuel F. Chambers, Gwynedd Valley, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 264 days.

This patent is subject to a terminal disclaimer.

(21) Appl. No.: 18/737,256

(22) Filed: Jun. 7, 2024

(65) Prior Publication Data

US 2024/0328249 A1 Oct. 3, 2024

Related U.S. Application Data

(63) Continuation of application No. 18/153,239, filed on Jan. 11, 2023, now Pat. No. 12,006,766, which is a (Continued)

(51) Int. Cl.
*E06B 9/42* (2006.01)
*E06B 9/40* (2006.01)

(Continued)

(52) U.S. Cl.
CPC .................. *E06B 9/42* (2013.01); *E06B 9/40* (2013.01); *E06B 9/70* (2013.01); *E06B 9/72* (2013.01)

(58) Field of Classification Search
CPC ..... E06B 9/42; E06B 9/40; E06B 9/72; E06B 9/70; E06B 9/17; E06B 9/17007;

(Continued)

(56) References Cited

U.S. PATENT DOCUMENTS

| | | | |
|---|---|---|---|
| 2,802,523 | A | 8/1957 | Anderle |
| 3,169,006 | A | 2/1965 | Lorentzen et al. |

(Continued)

FOREIGN PATENT DOCUMENTS

| | | | |
|---|---|---|---|
| CN | 201278353 | Y | 7/2009 |
| EP | 2631411 | A1 | 8/2013 |

(Continued)

*Primary Examiner* — Johnnie A. Shablack
(74) *Attorney, Agent, or Firm* — Duane Morris LLP

(57) ABSTRACT

A battery-powered window treatment, such as a roller shade, may include a battery compartment that provides access to batteries while the window treatment is assembled and mounted to a structure. The battery compartment may be pivotally supported by a housing of the window treatment, and operable between opened and closed positions. The batteries may be concealed when the battery compartment is closed, and may be accessible when the battery compartment is open. The battery compartment may be operated opened and closed while a shade of the window treatment is at any position, such that removal of the batteries does not result in the loss of tracking information for the shade. The window treatment may include a fascia that is operably connected to the battery compartment, such that when the battery compartment is opened, the fascia does not obstruct access to the batteries, and does not interfere with the shade.

18 Claims, 25 Drawing Sheets

Related U.S. Application Data continuation of application No. 17/196,129, filed on Mar. 9, 2021, now Pat. No. 11,578,531, which is a continuation of application No. 16/194,601, filed on Nov. 19, 2018, now Pat. No. 10,968,696, which is a continuation of application No. 15/339,075, filed on Oct. 31, 2016, now Pat. No. 10,132,116, which is a continuation of application No. 14/253,664, filed on Apr. 15, 2014, now Pat. No. 9,488,000.

(60) Provisional application No. 61/811,978, filed on Apr. 15, 2013.

(51) Int. Cl.
*E06B 9/70* (2006.01)
*E06B 9/72* (2006.01)

(58) Field of Classification Search
CPC .... E06B 9/17015; E06B 9/17023; E06B 9/56; E06B 9/68
See application file for complete search history.

(56) References Cited

U.S. PATENT DOCUMENTS

| | | | |
|---|---|---|---|
| 4,206,274 | A | 6/1980 | Peels |
| 4,269,908 | A | 5/1981 | Stemme |
| 4,314,294 | A | 2/1982 | Riccio et al. |
| 4,391,883 | A | 7/1983 | Williamson et al. |
| 4,531,562 | A | 7/1985 | Swanson |
| 4,885,219 | A | 12/1989 | Miller |
| 4,941,000 | A | 7/1990 | Cardoos, Jr. et al. |
| 5,134,347 | A | 7/1992 | Koleda |
| 5,337,215 | A | 8/1994 | Sunderland et al. |
| 5,391,967 | A | 2/1995 | Domel et al. |
| 5,413,499 | A | 5/1995 | Wright, Jr. et al. |
| 5,467,266 | A | 11/1995 | Jacobs et al. |
| 5,793,174 | A | 8/1998 | Kovach et al. |
| 5,804,332 | A | 9/1998 | Shimizu et al. |
| 5,848,634 | A | 12/1998 | Will et al. |
| 5,883,480 | A | 3/1999 | Domel et al. |
| 5,990,646 | A | 11/1999 | Kovach et al. |
| 6,057,658 | A | 5/2000 | Kovach et al. |
| 6,062,290 | A | 5/2000 | Domel |
| 6,117,575 | A | 9/2000 | Dinsdale |
| 6,181,089 | B1 | 1/2001 | Kovach et al. |
| 6,259,218 | B1 | 7/2001 | Kovach et al. |
| 6,369,530 | B2 | 4/2002 | Kovach et al. |
| 6,371,192 | B1 | 4/2002 | Anderson et al. |
| 6,382,294 | B1 | 5/2002 | Anderson et al. |
| 6,433,498 | B1 | 8/2002 | Domel et al. |
| 6,446,693 | B1 | 9/2002 | Anderson et al. |
| 6,516,858 | B1 | 2/2003 | Anderson et al. |
| 6,533,018 | B2 | 3/2003 | Anderson et al. |
| 6,812,662 | B1 | 11/2004 | Walker |
| 6,850,017 | B1 | 2/2005 | Domel et al. |
| 6,983,783 | B2 | 1/2006 | Carmen, Jr. et al. |
| 7,212,146 | B2 | 5/2007 | Nakamura |
| 7,299,848 | B2 | 11/2007 | Streib et al. |
| 7,389,806 | B2 | 6/2008 | Kates |
| 7,401,634 | B2 | 7/2008 | Kovach et al. |
| 7,466,090 | B2 | 12/2008 | Meewis et al. |
| 7,517,609 | B2 | 4/2009 | Cheng |
| 7,673,667 | B2 | 3/2010 | Domel et al. |
| 7,719,215 | B2 | 5/2010 | Meewis et al. |
| 7,723,939 | B2 | 5/2010 | Carmen, Jr. |
| 7,839,109 | B2 | 11/2010 | Carmen, Jr. et al. |
| 7,857,030 | B2 | 12/2010 | Cheng |
| 7,948,389 | B2 | 5/2011 | Sharpe et al. |
| 8,371,358 | B1 | 2/2013 | Mullet et al. |
| 8,540,005 | B2 | 9/2013 | Baugh et al. |
| 8,723,455 | B2 | 5/2014 | Mullet et al. |
| 8,820,388 | B2 | 9/2014 | Mullet et al. |
| 8,851,141 | B2 | 10/2014 | Blair et al. |
| 8,939,190 | B2 | 1/2015 | Mullet et al. |
| 8,950,461 | B2 | 2/2015 | Adams et al. |
| 9,045,939 | B2 | 6/2015 | Blair et al. |
| 9,115,537 | B2 | 8/2015 | Blair |
| D747,896 | S | 1/2016 | Clymer et al. |
| 9,228,359 | B2 | 1/2016 | Taylor |
| 9,249,624 | B2 | 2/2016 | Blair et al. |
| 9,447,636 | B2 | 9/2016 | Blair et al. |
| 9,488,000 | B2 | 11/2016 | Kirby et al. |
| D780,481 | S | 3/2017 | Clymer et al. |
| 9,605,478 | B2 | 3/2017 | Adams et al. |
| 9,670,724 | B2 | 6/2017 | Oakley |
| 9,745,796 | B2 | 8/2017 | Blair et al. |
| 9,810,020 | B2 | 11/2017 | Adams et al. |
| D808,684 | S | 1/2018 | Santilli |
| D814,213 | S | 4/2018 | Clymer et al. |
| 10,094,169 | B2 | 10/2018 | Kirby |
| 10,132,116 | B2 | 11/2018 | Kirby et al. |
| 10,227,822 | B2 | 3/2019 | Lagarde et al. |
| 10,334,977 | B2 | 7/2019 | Filko |
| 10,576,917 | B2 | 3/2020 | Taylor et al. |
| 10,689,905 | B2 | 6/2020 | Kirby et al. |
| 10,753,145 | B2 | 8/2020 | Biedermann |
| 10,851,587 | B2 | 12/2020 | Anthony et al. |
| 10,968,696 | B2 | 4/2021 | Kirby et al. |
| 11,002,071 | B2 | 5/2021 | Campagna et al. |
| 11,187,033 | B2 | 11/2021 | Ogden, Jr. et al. |
| 11,230,882 | B2 | 1/2022 | Blair et al. |
| 11,421,473 | B2 | 8/2022 | Campagna et al. |
| 11,578,531 | B2 | 2/2023 | Kirby et al. |
| 12,006,766 | B2 * | 6/2024 | Kirby ........................ E06B 9/72 |
| 2002/0189768 | A1 | 12/2002 | Anderson et al. |
| 2003/0168187 | A1 | 9/2003 | Wen et al. |
| 2005/0205733 | A1 | 9/2005 | Nien |
| 2007/0284053 | A1 | 12/2007 | Mullet et al. |
| 2008/0150461 | A1 | 6/2008 | Adamus et al. |
| 2008/0230185 | A1 | 9/2008 | Kahn |
| 2008/0236763 | A1 | 10/2008 | Kates |
| 2008/0260363 | A1 | 10/2008 | Carmen et al. |
| 2009/0199975 | A1 | 8/2009 | Yeh |
| 2009/0308543 | A1 | 12/2009 | Kates |
| 2010/0092855 | A1 | 4/2010 | Cheng |
| 2010/0269988 | A1 | 10/2010 | Mullet et al. |
| 2011/0203748 | A1 | 8/2011 | Mullet et al. |
| 2011/0203754 | A1 | 8/2011 | Mullet et al. |
| 2011/0253320 | A1 | 10/2011 | Baugh et al. |
| 2011/0272106 | A1 | 11/2011 | Mullet et al. |
| 2012/0031571 | A1 | 2/2012 | Mullet et al. |
| 2012/0090797 | A1 | 4/2012 | Mullet et al. |
| 2012/0225340 | A1 | 9/2012 | Mullet et al. |
| 2012/0255689 | A1 | 10/2012 | Blair et al. |
| 2012/0261078 | A1 | 10/2012 | Adams et al. |
| 2012/0261079 | A1 | 10/2012 | Chambers et al. |
| 2013/0098561 | A1 | 4/2013 | Mullet et al. |
| 2013/0153162 | A1 | 6/2013 | Blair et al. |
| 2013/0233496 | A1 | 9/2013 | Ogden, Jr. et al. |
| 2015/0226001 | A1 | 8/2015 | Adams et al. |
| 2015/0247362 | A1 | 9/2015 | Kirby |
| 2015/0300079 | A1 | 10/2015 | Dallan |
| 2016/0123076 | A1 | 5/2016 | Kirby |
| 2016/0362932 | A1 | 12/2016 | Blair et al. |
| 2017/0044824 | A1 | 2/2017 | Kirby et al. |
| 2017/0260806 | A1 | 9/2017 | Adams et al. |
| 2017/0263891 | A1 | 9/2017 | Oh et al. |
| 2017/0362891 | A1 | 12/2017 | Blair et al. |
| 2024/0328249 | A1 * | 10/2024 | Kirby ........................ E06B 9/42 |

FOREIGN PATENT DOCUMENTS

| | | | |
|---|---|---|---|
| GB | 2500981 | A | 10/2013 |
| WO | 2005093682 | A1 | 10/2005 |
| WO | 2007055574 | A1 | 5/2007 |
| WO | 2007133450 | A2 | 11/2007 |

* cited by examiner

INTEGRATED ACCESSIBLE BATTERY COMPARTMENT FOR MOTORIZED WINDOW TREATMENT

CROSS-REFERENCE TO RELATED APPLICATIONS

This application is a continuation of U.S. patent application Ser. No. 18/153,239, filed Jan. 11, 2023 (now U.S. Pat. No. 12,006,766), which is a continuation of U.S. patent application Ser. No. 17/196,129, filed Mar. 9, 2021 (now U.S. Pat. No. 11,578,531), which is a continuation of U.S. patent application Ser. No. 16/194,601, filed Nov. 19, 2018 (now U.S. Pat. No. 10,968,696), which is a continuation of U.S. patent application Ser. No. 15/339,075, filed Oct. 31, 2016 (now U.S. Pat. No. 10,132,116), which is a continuation of U.S. patent application Ser. No. 14/253,664, filed Apr. 15, 2014 (now U.S. Pat. No. 9,488,000), which claims priority to U.S. Provisional Patent Application No. 61/811,978, filed Apr. 15, 2013, the entire disclosures of which are incorporated herein by reference in their entireties.

BACKGROUND

A window treatment may be mounted in front of one or more windows, for example to prevent sunlight from entering a space and/or to provide privacy. Window treatments may include, for example, roller shades, roman shades, venetian blinds, or draperies. A roller shade typically includes a flexible shade fabric wound onto an elongated roller tube. Such a roller shade may include a weighted hembar located at a lower end of the shade fabric. The hembar may cause the shade fabric to hang in front of one or more windows that the roller shade is mounted in front of.

A window treatment may be motorized. For example, a motorized roller shade may include a motor drive unit that is coupled to the roller tube to provide for tube rotation. When operated, the motor drive unit may cause the roller tube to rotate, such that the lower end of the shade fabric is raised or lowered, for example along a vertical direction. In a typical motorized roller shade, the motor drive unit and the roller tube may be retained within a housing that is mounted in front of one or more windows, for example attached to a window frame.

The motor drive unit of a motorized window treatment (e.g., a roller shade) may powered, for example, by an alternating current (AC) source, a direct current (DC) source, by one or more batteries, or any combination thereof.

In an example of a known battery-powered roller shade, the batteries may be held in a battery holder, such as a battery compartment, that is discrete from the housing of the roller shade. Such a discrete battery compartment may be mounted separately from the housing of the roller shade. However, such a configuration is not ideal because a discrete battery compartment may diminish the aesthetics of a roller shade.

In other examples of known battery-powered roller shades, one or more batteries may be held within the roller tube, for example along with the motor drive unit. However, such configurations are not ideal because gaining access to the batteries, for example to change them, may be difficult. For example, in one such configuration, the entire housing of the roller shade must be removed from its mounted position in order to gain access to the batteries, which may be undesirably laborious. In another example of such a configuration, the shade fabric may need to be fully and manually extended (e.g., beyond a desired lowered position) in order to gain access to the batteries, which may be undesirable.

SUMMARY

As described herein, a battery-powered window treatment, such as a roller shade, may include a battery compartment that is configured to retain one or more batteries. The battery compartment may be configured to provide easy access to the one or more batteries, for example to allow quick replacement of the one or more batteries. The window treatment may be configured to be mounted to a structure, such as a window frame. The window treatment may include a window treatment assembly (e.g., a shade assembly). The window treatment assembly may include a covering material (e.g., a shade fabric) and a roller tube. The window treatment assembly may be configured to cause the covering material to operate between raised and lowered positions. The window treatment may include a housing that is configured to support the battery compartment and the window treatment assembly.

The battery compartment may be integrated with the housing of the window treatment, and may be configured to be operated between opened and closed positions. When the battery compartment is in the closed position, the one or more batteries may be concealed from view. When the battery compartment is in the open position, the one or more batteries may be visible and accessible, such that one or more batteries may be removed from the battery compartment. When the battery compartment is in the open position, the batteries may be accessible along a direction that is normal to a longitudinal axis of the roller tube. When the battery-powered window treatment is mounted inside of a window frame, the batteries may be accessible within an area defined by the periphery of the window frame.

The battery compartment may be configured so as to be operable between the opened and closed positions while the window treatment is in an assembled configuration and is mounted to a structure (e.g., to a window frame). The battery compartment may be configured to be operable between the opened and closed positions while the covering material is at any position between the lowered and raised positions, for example such that removal of one or more batteries from the battery compartment does not result in the loss of tracking information for the covering material.

The battery compartment may be easily operated between the opened and closed positions, for instance without the need for tools. For example, an individual may operate the battery compartment between the opened and closed positions using one hand. Batteries may be removed from, or inserted into, the battery compartment using one hand. Such one-handed operation may enable the individual to freely use their other hand while replacing the batteries of the window treatment, for instance to brace himself or herself on a ladder.

The battery compartment may include a battery holder that is configured to retain one or more batteries, a cover that is configured to at least partially enclose the battery holder, and a support that is attached to the battery holder and to the cover. The battery compartment may be configured to be pivotally supported by the housing of the window treatment, such that the battery compartment pivots about a pivot axis when operated between the opened and closed positions.

The window treatment may include a fascia that covers the battery compartment and the window treatment assembly when the battery compartment is in the closed position.

The fascia may be operably connected to the battery compartment, such that when the battery compartment is operated to the opened position, the fascia moves away from the battery compartment, does not obstruct access to one or more batteries held by the battery compartment, and does not interfere with components of the window treatment assembly (e.g., the covering material).

DETAILED DESCRIPTION

Figure 1A:
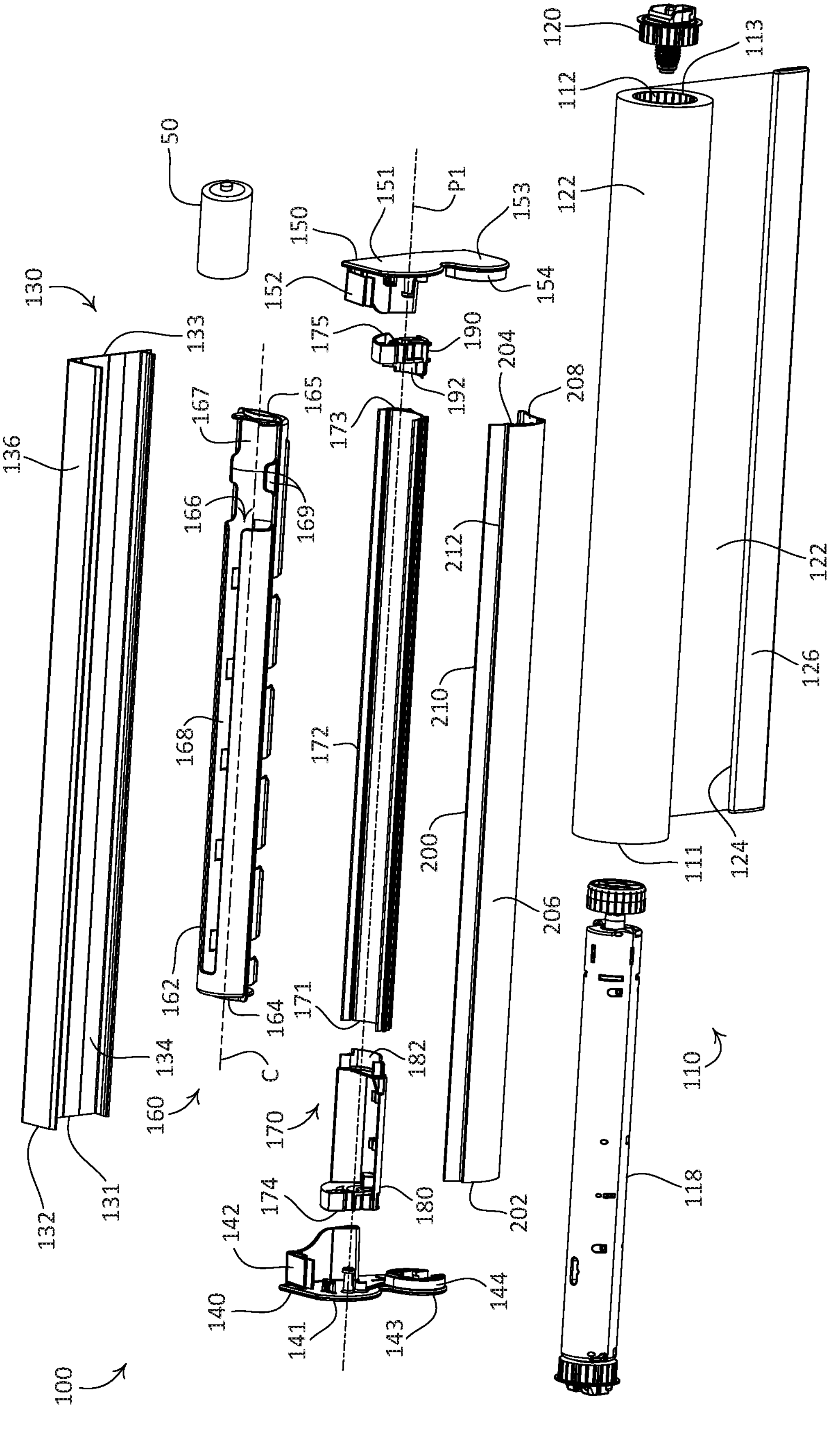
FIG. 1A is an exploded view of an example battery-powered roller shade having an integrated, accessible battery compartment.
Figure 1B:
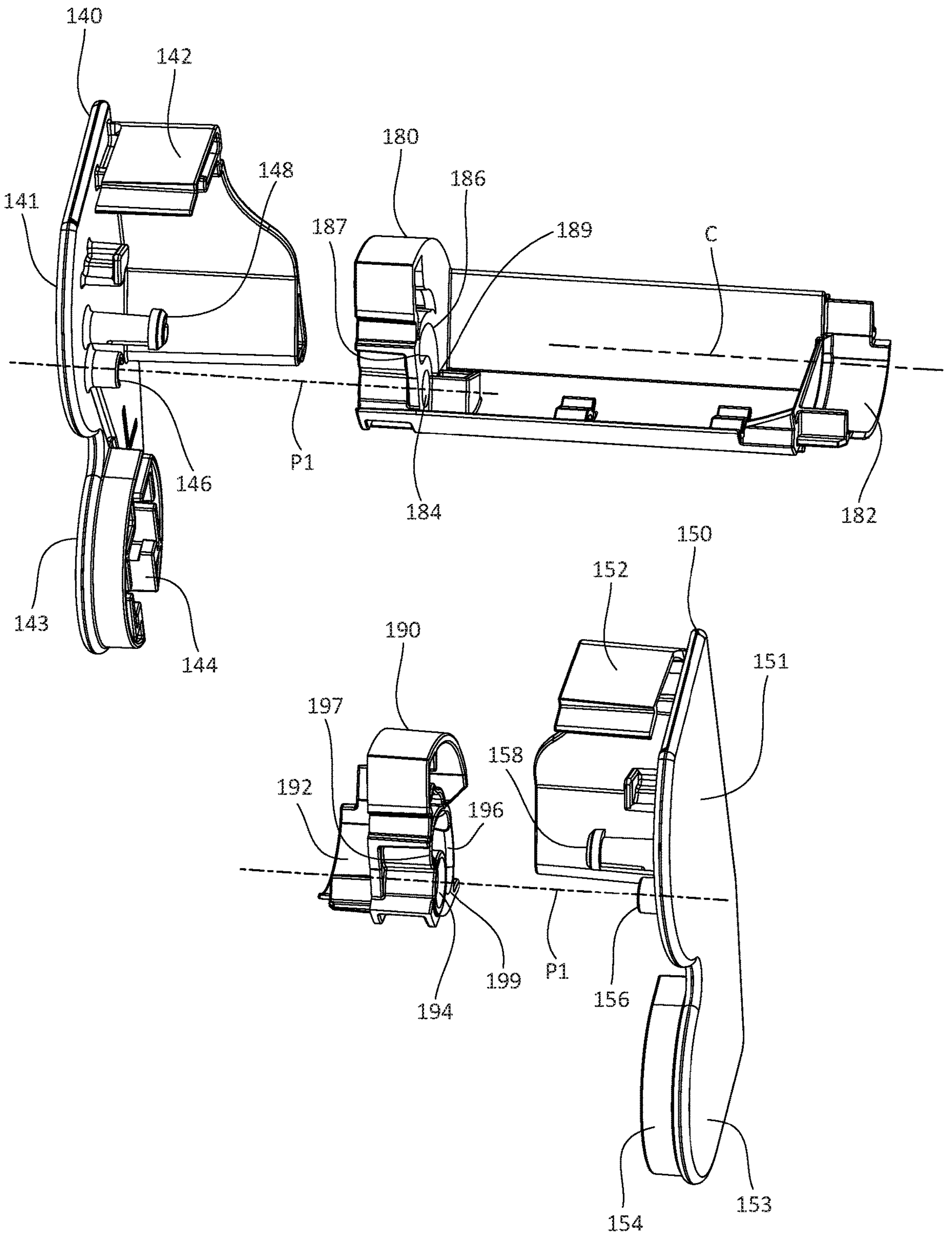
FIG. 1B is a perspective view of components of the accessible battery compartment of the example battery-powered roller shade depicted in FIG. 1A.

FIGS. 1A-1G depict an example battery-powered roller shade 100 that may be mounted in front of an opening, such as one or more windows, to prevent sunlight from entering a space and/or to provide privacy. The battery-powered roller shade 100 may be mounted to a structure that is proximate to the opening, such as a window frame, a wall, or other structure. As shown, the battery-powered roller shade 100 includes a window treatment assembly (e.g., a shade assembly 110), a battery compartment 160, and a housing 130 that may be configured to support the shade assembly 110 and the battery compartment 160. The housing 130 may be configured as a mounting structure and/or a support structure.

Figure 1C:
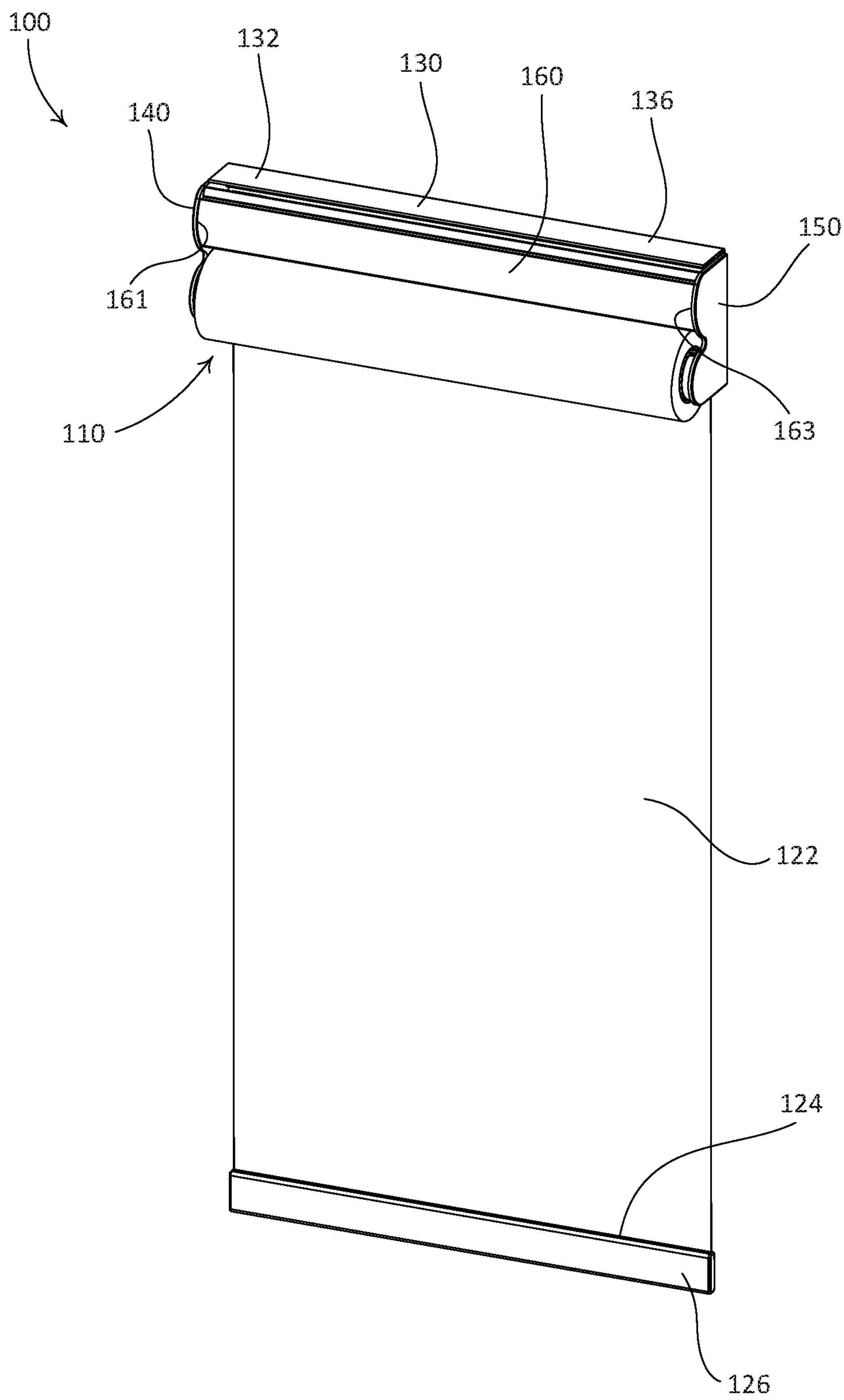
FIG. 1C is a perspective view of the example battery-powered roller shade depicted in FIG. 1A, with the shade in a lowered position and the battery compartment in a closed position.
Figure 1D:
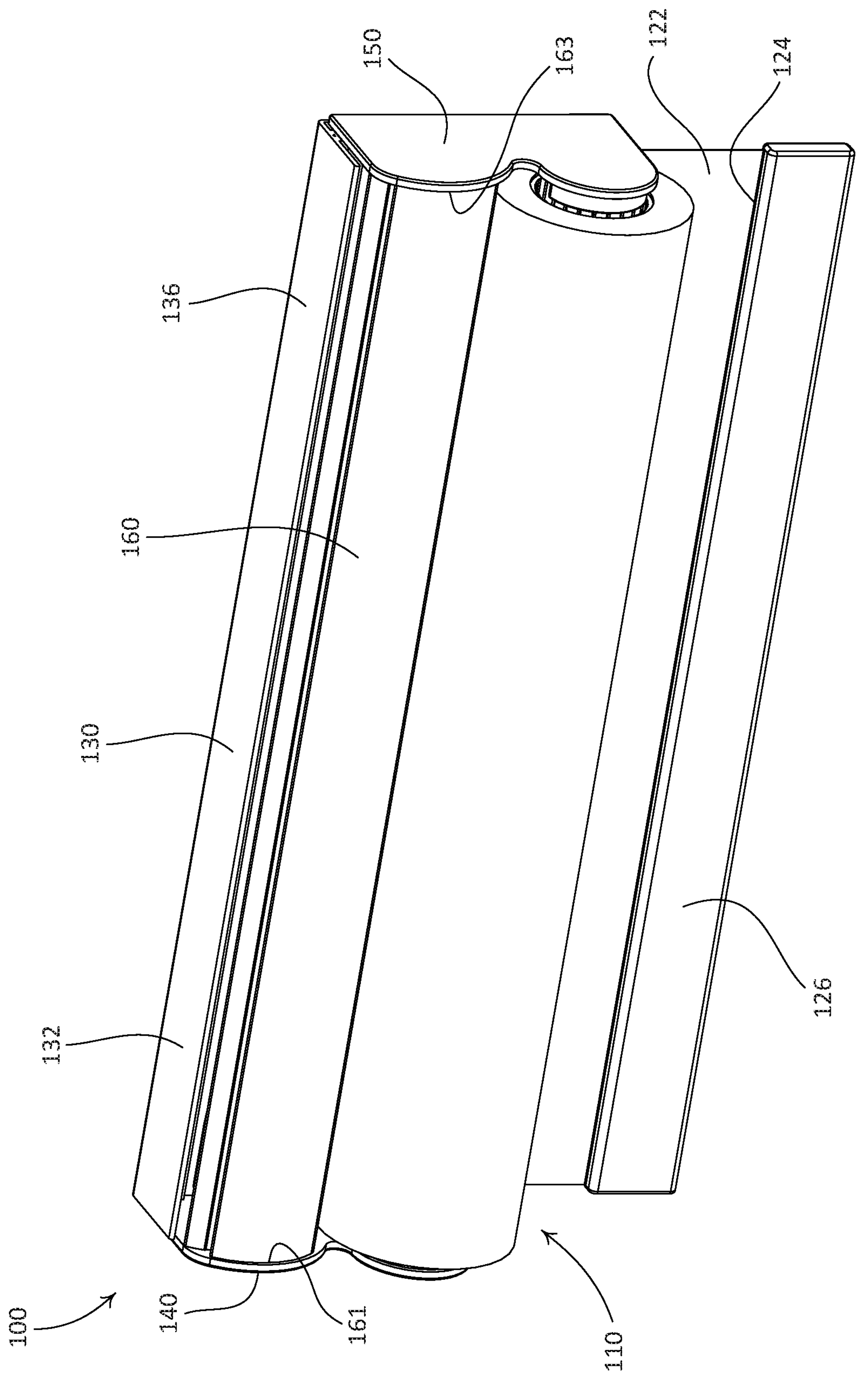
FIG. 1D is a perspective view of the example battery-powered roller shade depicted in FIG. 1A, with the shade in a raised position and the battery compartment in a closed position.
Figure 1E:
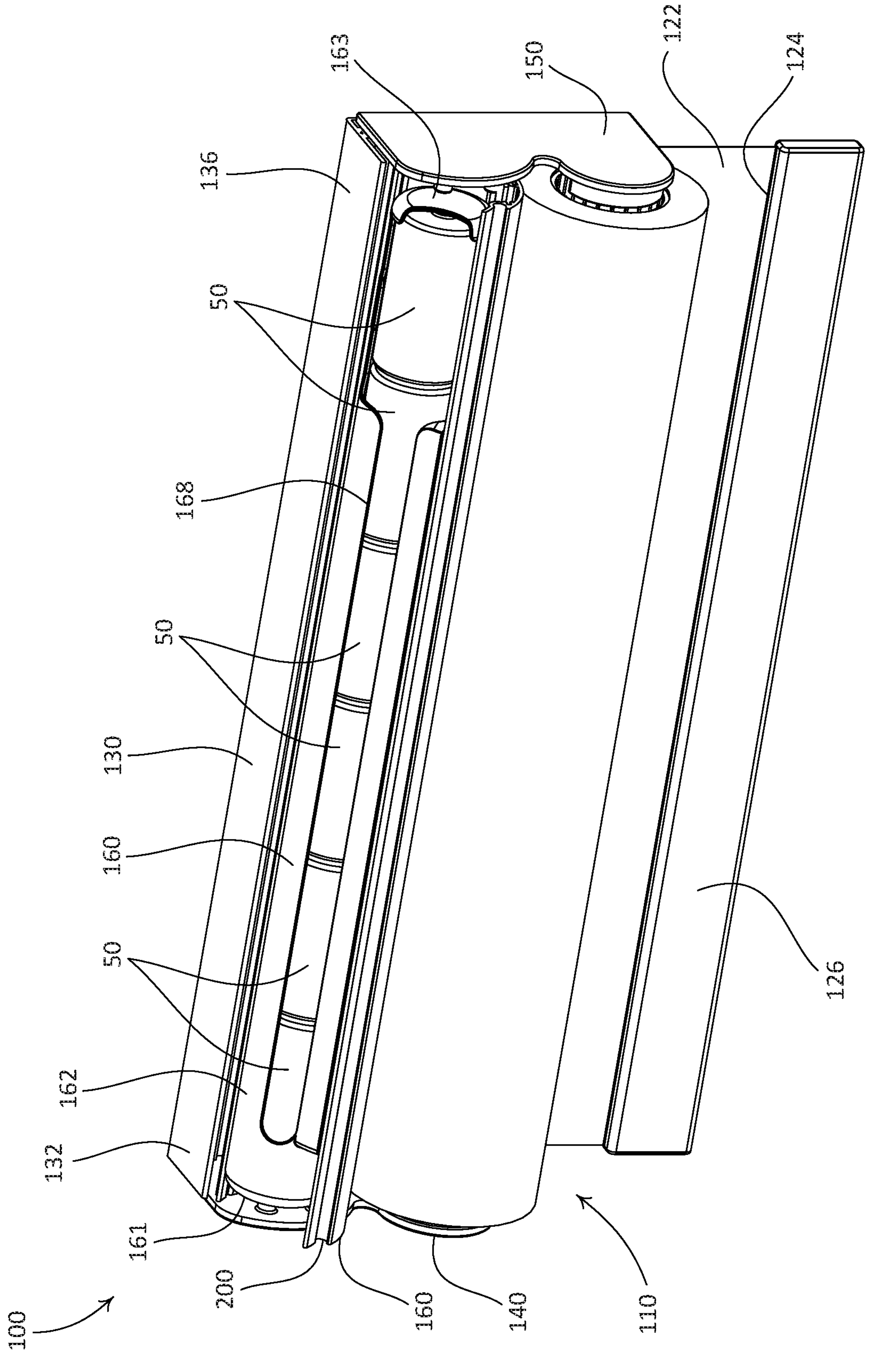
FIG. 1E is a perspective view of the example battery-powered roller shade depicted in FIG. 1A, with the shade in the raised position and the battery compartment in an opened position.

The battery compartment 160 may be configured to retain one or more batteries 50. The illustrated battery 50 may be, for example, a D cell (e.g., IEC R20) battery. The battery compartment 160 may be configured to be operable between an opened position (e.g., as shown in FIG. 1E) and a closed position (e.g., as shown in FIG. 1D), such that one or more batteries 50 may be accessible when the battery compartment 160 is in the opened position. The battery-powered roller shade 100 may be configured such that the battery compartment 160 is mechanically bistable with respect to the opened and closed positions.

As shown, the shade assembly 110 includes a roller tube 112, a motor drive unit 118, an idler 120, a covering material (e.g., a shade fabric 122), and a hembar 126. The roller tube 112 may define a cylindrical shape that is elongate between a first end 111 and a second end 113. As shown, the roller tube 112 is hollow, and open at the first and second ends 111, 113. The roller tube 112 may be configured to at least partially receive the motor drive unit 118, and to at least partially receive the idler 120. As shown, the roller tube 112 is configured such that a portion of the motor drive unit 118 may be disposed in the first end 111, and such that a portion of the idler 120 may be disposed in the second end 113. The roller tube 112 may be made of any suitable material, such as metal. The motor drive unit 118 may be operably coupled to the roller tube 112 when the motor drive unit 118 is disposed in the first end 111 of the roller tube 112, such that operation of the motor drive unit 118 causes the roller tube 112 to rotate.

The shade fabric 122 may define an upper end (not shown) that is attached to the roller tube 112, and an opposed lower end 124. The roller tube 112 may define a central, longitudinal axis, about which the roller tube 112 may rotate. Rotation of the roller tube 112 about the longitudinal axis, for example rotation caused by the motor drive unit 118, may cause the shade fabric 122 to wind onto, or to unwind from, the roller tube 112. In this regard, the motor drive unit 118 may adjust the covering material (e.g., the shade fabric 122), for instance between raised and lowered positions. The shade fabric 122 may be referred to as a motorized shade.

Rotation of the roller tube 112 in a first direction about the longitudinal axis may cause the shade fabric 122 to unwind from the roller tube 112, for example as the shade fabric 122 is operated to a lowered position relative to an opening (e.g., a window). FIG. 1C depicts the battery-powered roller shade 100, with the shade fabric 122 in a lowered position. Rotation of the roller tube 112 in a second direction, about the longitudinal axis, that is opposite the first direction may cause the shade fabric 122 to wind onto the roller tube 112, for example as the shade fabric 122 is operated to a raised position relative to the opening. FIG. 1D depicts the battery-powered roller shade 100, with the shade fabric 122 in a raised position. The shade fabric 122 may be made of any suitable material, or combination of materials. For example, the shade fabric 122 may be made from one or more of "scrim," woven cloth, non-woven material, light-control film, screen, or mesh. The hembar 126 may be attached to the lower end 124 of the shade fabric 122, and may be weighted, such that the hembar 126 causes the shade fabric 122 to hang (e.g., vertically) in front of one or more windows.

The motor drive unit 118 may be configured to enable control of the rotation of the roller tube 112, for example by a user of the battery-powered roller shade 100. For example, a user of the battery-powered roller shade 100 may control the motor drive unit 118 such that the shade fabric 122 is moved to a desired position. The motor drive unit 118 may include a sensor that monitors a position of the roller tube 112. This may enable the motor drive unit 118 to track a position of the shade fabric 122 relative to respective upper and lower limits of the shade fabric 122. The upper and lower limits may be specified by an operator of the battery-powered roller shade 100, and may correspond to the raised and lowered positions of the shade fabric 122, respectively.

The motor drive unit 118 may be manually controlled (e.g., by actuating one or more buttons) and/or wirelessly controlled (e.g., using an infrared (IR) or radio frequency (RF) remote control unit). Examples of motor drive units for motorized roller shades are described in greater detail in U.S. Pat. No. 6,983,783, issued Jan. 10, 2006, entitled MOTORIZED SHADE CONTROL SYSTEM; U.S. Pat. No. 7,839,109, issued Nov. 23, 2010, entitled METHOD OF CONTROLLING A MOTORIZED WINDOW TREATMENT; U.S. Patent Application Publication No. 2012/0261078, published Oct. 18, 2012, entitled MOTORIZED WINDOW TREATMENT; and U.S. Patent Application Publication No. 2013/0153162, published Jun. 20, 2013, entitled BATTERY-POWERED MOTORIZED WINDOW TREATMENT HAVING A SERVICE POSITION, the entire contents of each of which are incorporated herein by reference. It should be appreciated, however, that any motor drive unit or drive system may be used to control the roller tube 112.

The battery-powered roller shade 100 may include an antenna (not shown) that is configured to receive wireless signals (e.g., RF signals from a remote control device). The antenna may be in electrical communication with the motor drive unit 118 (e.g., via a control circuit or PCB), such that one or more wireless signals received from a remote control unit may cause the motor drive unit 118 to move the shade fabric 122 (e.g., between the lowered and raised positions). The antenna may be integrated with (e.g., pass through, be enclosed within, and/or be mounted to) one or more of the shade assembly 110, the housing 130, the battery compartment 160, or respective components thereof.

As shown, the housing 130 includes a rail 132, a first housing bracket 140, and a second housing bracket 150. The illustrated rail 132 is elongate between a first end 131 and an opposed second end 133. The rail 132, the first housing bracket 140, and the second housing bracket 150 may be configured to attach to one another in an assembled configuration. For example, the first housing bracket 140 may be configured to be attached to the first end 131 of the rail 132, and the second housing bracket 150 may be configured to be attached to the second end 133 of the rail 132. As shown, the first housing bracket 140 defines an attachment member 142 that is configured to engage the first end 131 of the rail 132, and the second housing bracket 150 defines an attachment member 152 that is configured to engage the second end 133 of the rail 132. It should be appreciated that the rail 132, the first housing bracket 140, and the second housing bracket 150 are not limited to the illustrated attachment members.

One or more of the rail 132, the first housing bracket 140, or the second housing bracket 150, may be sized for mounting to a structure. For example, the rail 132 may be sized such that, with the first and second housing brackets 140, 150 attached to the rail 132, the rail 132 may be mounted to a structure in an opening (e.g., to a window frame). In such an example configuration, the rail 132 may define a length, for example as defined by the first and second ends 131, 133, such that the housing 130 may fit snugly in a window frame (e.g., with little clearance between the first and second housing brackets 140, 150 and adjacent structure of a window frame). This configuration may be referred to as an internal mount configuration. In another example, the rail 132 may be sized such that, with the first and second housing brackets 140, 150 attached to the rail 132, the rail 132 may be mounted to a structure above an opening (e.g., to a surface above a window). In such an example configuration, the rail 132 may define a length that is substantially equal to (e.g., slightly longer than) a width of the window opening. It should be appreciated, however, that the battery-powered roller shade 100 is not limited to these example mounting configurations.

The rail 132 may define any suitable shape. As shown, the rail 132 includes a rear wall 134 that may be configured to be mounted to a structure, and an upper wall 136 that extends outward from an upper edge of the rear wall 134 along a direction that is substantially normal to the rear wall 134. The rail 132, the first housing bracket 140, and the second housing bracket 150, when in an assembled configuration, may define a cavity 138. The shade assembly 110 and the battery compartment 160 may be disposed in the cavity 138, for example when the battery-powered roller shade 100 is in an assembled configuration (e.g., as shown in FIGS. 1C, 1D, and 1E). When the battery-powered roller shade 100 is in an assembled configuration, the housing 130 may be open at the front and bottom, such that the shade assembly 110 and the battery compartment 160 are exposed.

The housing 130 may be configured to support one or both of the shade assembly 110 and the battery compartment 160. For example, the first and second housing brackets 140, 150 may be configured to support the shade assembly 110 and/or the battery compartment 160. As shown, the first and second housing brackets 140, 150 are configured to support the shade assembly 110 and the battery compartment 160 such that the battery compartment 160 is located (e.g., is oriented) above the shade assembly 110 when the battery-powered roller shade 100 is mounted to a structure. It should be appreciated that the battery-powered roller shade 100 is not limited to the illustrated orientation of the shade assembly 110 and the battery compartment 160. For example, the housing 130 may be alternatively configured to otherwise support the shade assembly 110 and the battery compartment 160 relative to each other (e.g., such that the battery compartment 160 is located below the shade assembly 110).

As shown, the first housing bracket 140 defines an upper portion 141 and a lower portion 143. The lower portion 143 may be configured to operably support the shade assembly 110, such that the shade fabric 122 may be moved (e.g., between the lowered and raised positions). For example, as shown, the lower portion 143 defines an attachment member 144 that is configured to receive a complementary attachment member of the motor drive unit 118.

The upper portion 141 may be configured to operably support the support the battery compartment 160, such that the battery compartment 160 is operable to provide access to one or more batteries 50 when the battery-powered roller shade 100 is mounted to a structure, in an assembled configuration. For example, as shown, the upper portion 141 defines a post 146 that extends into the cavity 138 when the first housing bracket 140 is attached to first end 131 the rail 132. The post 146 may be referred to as a first post. The post 146 may be configured to be received by the battery compartment 160, such that the battery compartment is pivotable (e.g., rotatable) about the post 146 between the closed position (e.g., as shown in FIG. 1D) and an opened position (e.g., as shown in FIG. 1E).

As shown, the upper portion 141 further defines a projection 148 that that extends into the cavity 138 when the first housing bracket 140 is attached to the rail 132. The projection 148 may be referred to as a first projection, and may extend further into the cavity 138 than the post 146. Stated differently, the projection 148 may be longer than the post 146. The projection 148 may be configured to be received by the battery compartment 160, such that pivoting of the battery compartment 160 about the post 146 is limited.

As shown, the second housing bracket 150 defines an upper portion 151 and a lower portion 153. The lower portion 153 may be configured to operably support the shade assembly 110, such that the shade fabric 122 may be moved (e.g., between the lowered and raised positions). For example, as shown, the lower portion 153 defines an attachment member 154 that is configured to receive a complementary attachment member of the idler 120.

The upper portion 151 may be configured to operably support the battery compartment 160, such that the battery compartment 160 is operable to provide access to one or more batteries 50 when the battery-powered roller shade 100 is mounted to a structure, and is in an assembled configuration. For example, as shown, the upper portion 151 defines a post 156 that extends into the cavity 138 when the second housing bracket 150 is attached to second end 133 of the rail 132. The post 156 may be referred to as a second post. The post 156 may be configured to be received by the battery compartment 160, such that the battery compartment is pivotable (e.g., rotatable) about the post 156 between the closed position and the opened position.

As shown, the upper portion 151 further defines a projection 158 that extends into the cavity 138 when the second housing bracket 150 is attached to the rail 132. The projection 158 may be referred to as a second projection, and may extend further into the cavity 138 than the post 156. Stated differently, the projection 158 may be longer than the post 156. The projection 158 may be configured to be received by the battery compartment 160, such that pivoting of the battery compartment 160 about the post 156 is limited.

When the first and second housing brackets 140, 150 are attached to the rail 132 (e.g., when the housing 130 is in an assembled configuration), the post 146 and the post 156 may be aligned with each other, and may define a pivot axis P1 about which the battery compartment 160 may pivot, for example between the opened and closed positions. The pivot axis P1 may be referred to as a first pivot axis. The housing 130 may support the shade assembly 110 such that the shade assembly 110 remains in a static, supported position when the battery compartment 160 is operated between the opened and closed positions. For example, as shown, the first and second housing brackets 140, 150 support the shade assembly 110 such that when the battery-powered roller shade 100 is in an assembled configuration and is mounted to a structure, the shade assembly 110 does not move relative to the structure when the battery compartment 160 is operated between the opened and closed positions.

The housing 130 may be configured to be mounted to structure using one or more fasteners (e.g., one or more screws). For example, one or more of the rail 132, the first housing bracket 140, or the second housing bracket 150 may define one or more respective apertures that are configured to receive fasteners.

The components of the housing 130 may be made of any suitable material or combination of materials. For example, the rail 132 may be made of metal and the first and second housing brackets 140, 150 may be made of plastic. Although the illustrated housing 130 includes separate components, it should be appreciated that the housing 130 may be otherwise constructed. For example, the rail 132, the first housing bracket 140, and the second housing bracket 150 may be monolithic. In another example, the rail may include first and second rail sections that may be configured to attach to one another. In such an example configuration, the first rail section may include an integrated first housing bracket and the second rail section may include an integrated second housing bracket. One or more components of the housing 130 (e.g., one or more of the rail 132, the first housing brackets 140, or the second housing bracket 150) may be wrapped in a material (e.g., fabric), for instance to enhance the aesthetics of the housing 130.

The battery compartment 160 may be configured to hold (e.g., to retain) one or more batteries 50. The battery compartment 160, when supported by the housing 130, may be operated between an opened position and a closed position, for example by causing the battery compartment 160 to pivot about the pivot axis P1. When the battery compartment 160 is in the closed position (e.g., as shown in FIG. 1D), the one or more batteries 50 held by the battery compartment 160 are concealed from view. When the battery compartment 160 is in the opened position (e.g., as shown in FIG. 1E), the one or more batteries 50 held by the battery compartment 160 may be at least partially visible, and are accessible, such that one or more batteries 50 may be removed from, or disposed into, the battery compartment 160. For example, when the battery compartment 160 is in the opened position, one or more batteries 50 may be removed from, or disposed into, the battery compartment 160 along a direction that is normal to the longitudinal axis of the roller tube 112. In this regard, one or more batteries 50 held by the battery compartment 160 are accessible along a direction that is normal to the longitudinal axis when the battery compartment 160 is in the opened position. In an example of mounting the battery-powered roller shade 100 to a structure, the battery-powered roller shade 100 may be mounted internally with respect to the frame of a window (e.g., inside the window frame of the window), for example in accordance with an internal mount configuration. When the battery-powered roller shade 100 is mounted inside of a window frame, the batteries 50 may be accessible within an arca defined by a periphery of the window frame. The battery compartment 160 may be operated between the opened and closed positions when the battery-powered roller shade 100 is in an assembled configuration and is mounted to a structure.

In accordance with the illustrated battery-powered roller shade 100, the battery compartment 160 may be operated between closed and opened positions, regardless of what position the shade fabric 122 is in relative to the roller tube 112. For example, the battery compartment 160 may be operated between the opened and closed position when the shade fabric 122 is in a lowered position, is in a raised position, or is in any intermediate position between the raised and lowered positions. Stated differently, the battery compartment 160 may be operated between the opened and closed positions independently of an amount of the shade fabric 122 that is lowered. Stated differently still, the battery compartment 160 may be operated between the opened and closed positions without adjusting the roller tube 112 (e.g., without causing the roller tube 112 to rotate). Because the shade fabric 122 may remain in a static position while the battery compartment 160 is operated between the closed and opened positions, the motor drive unit 118 may properly maintain tracking information of the position of the shade fabric 122 while one or more batteries 50 are removed from the battery compartment 160 (e.g., while one or more batteries 50 are replaced).

Figure 1F:
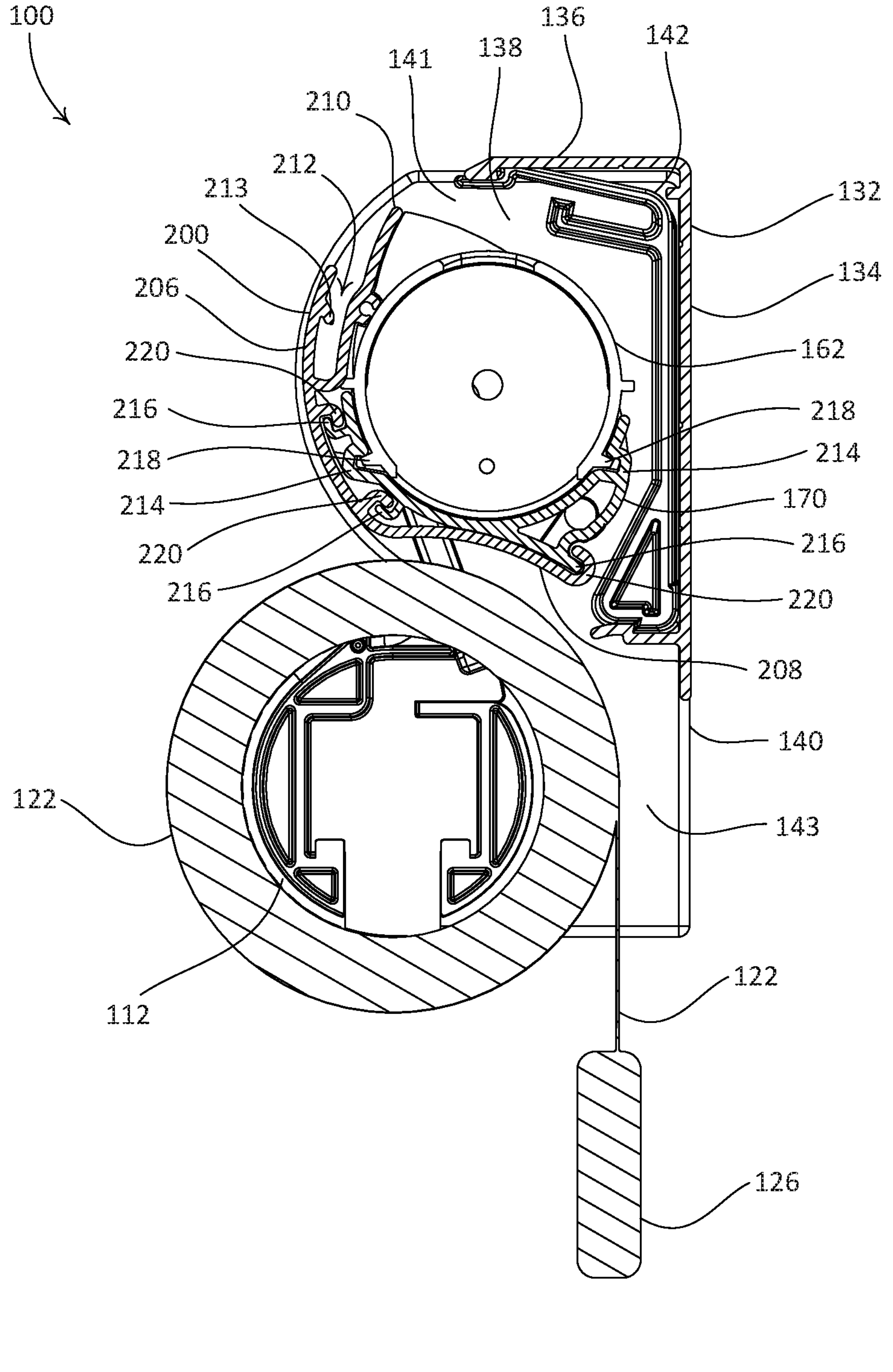
FIG. 1F is a side section view of the example battery-powered roller shade depicted in FIG. 1A, with the shade in the raised position and the battery compartment in a closed position.

When the illustrated battery compartment 160 is operated from the closed position (e.g., as shown in FIG. 1F) to the opened position (e.g., as shown in FIG. 1F), the battery compartment 160 pivots about the pivot axis P1, such that the battery compartment 160, and thus one or more batteries 50 retained by the battery compartment 160, moves away from (e.g., rotates away from) a plane defined by the shade fabric 122 (e.g., a plane defined by a portion of the shade fabric 122 that is unwound from the roller tube 112 and is hanging vertically). In this regard, when the battery compartment 160 is operated from the closed position to the opened position, the battery compartment 160 may move away from (e.g., rotate away from) a structure that the battery-powered roller shade 100 is mounted to (e.g., a window frame).

The illustrated battery compartment 160 is elongate between a first end 161 and an opposed second end 163. The battery compartment 160 may be configured to hold one or more batteries 50, for example in a linear (e.g., coaxial) arrangement between the first and second ends 161, 163. The battery compartment 160 may be in electrical communication with (e.g., electrically coupled to) one or more electrical components of the battery-powered roller shade 100, for instance the motor drive unit 118, such that DC power from the one or more batteries 50 is delivered to the electrical components. For example, the battery compartment 160 may include respective electrical contacts disposed at the first and second ends 161, 163. The electrical contacts may be configured to abut corresponding terminals of a first battery 50 disposed at the first end 161, and of a last battery 50 disposed at the second end 163, so as to place the batteries 50 in electrical communication with one or more electrical components of the battery-powered roller shade 100.

The electrical contacts may be placed in electrical communication with one or components of the battery-powered roller shade 100. For example, corresponding wires may connect the electrical contacts to the motor drive unit 118. The wires may be integrated with (e.g., pass through, be enclosed within, and/or be mounted to) one or more of the shade assembly 110, the housing 130, the battery compartment 160, or respective components thereof. For example, wires may be run from the electrical contacts, through the battery compartment 160 along the pivot axis P1 (e.g., through one or both of the posts 146, 156), along a surface of the housing 130, into the shade assembly 110, and to the motor drive unit 118.

As shown, the battery compartment 160 includes a battery holder 162, a support 170, and a cover 200. The battery holder 162 may be configured to hold (e.g., to retain) one or more batteries 50 within the battery compartment 160. The battery holder 162, the support 170, and the cover 200 may be configured to be attached to one another, for example when the battery compartment 160 is in an assembled configuration. The antenna of the battery-powered roller shade 100 may be arranged on the cover 200 and may be in electrical communication with the motor drive unit 118. For example, the antenna may comprise a monopole antenna (e.g., a wire). For example, the antenna may extend along a surface of the cover 200, along the pivot axis P1 (e.g., through one or both of the posts 146, 156), into the shade assembly 110, and to the motor drive unit 118.

The illustrated battery holder 162 is elongate between a first end 164 and an opposed second end 165. The battery holder 162 may define any suitable shape, such as the illustrated cylindrical shape. The battery holder 162 may define a cavity that is sized to receive one or more batteries 50. For example, as shown, the battery holder 162 defines a cylindrical channel 166 that is configured to receive one or more batteries 50 in a linear (e.g., coaxial) arrangement between the first and second ends 164, 165. The channel 166 may define a diameter that is slightly larger than an outer diameter of a battery 50, such that a battery 50 may move (e.g., slide) when disposed in the battery holder 162. The diameter of the channel 166 may be, for example, in the range of about 1.25 inches to about 1.38 inches, such as about 1.3 inches. The battery holder 162 may be made of any suitable material, such as plastic.

As shown, the battery holder 162, and thus the battery compartment 160, is configured to retain six (6) D cell (e.g., IEC R20) batteries in a head to tail, linear (e.g., coaxial) arrangement in the channel 166. The battery holder 162 may have a length (e.g., as defined by the first and second ends

164, 165) such that the batteries 50 are held in respective positions in the channel 166 when the battery holder 162 is filled with six batteries 50. The battery holder 162 may include respective electrical contacts disposed at the first and second ends 164, 165. One or more of the electrical contacts may be configured to press the corresponding terminals of the batteries 50 against one another, for example to maintain electrical communication among the batteries 50. It should be appreciated that the battery holder 162, and thus the battery compartment 160, is not limited to the illustrated number and size of batteries 50 or to the illustrated linear arrangement of batteries 50, and that the battery compartment 160 may be alternatively configured to hold more or fewer batteries of any size, in any suitable arrangement.

Figure 1G:
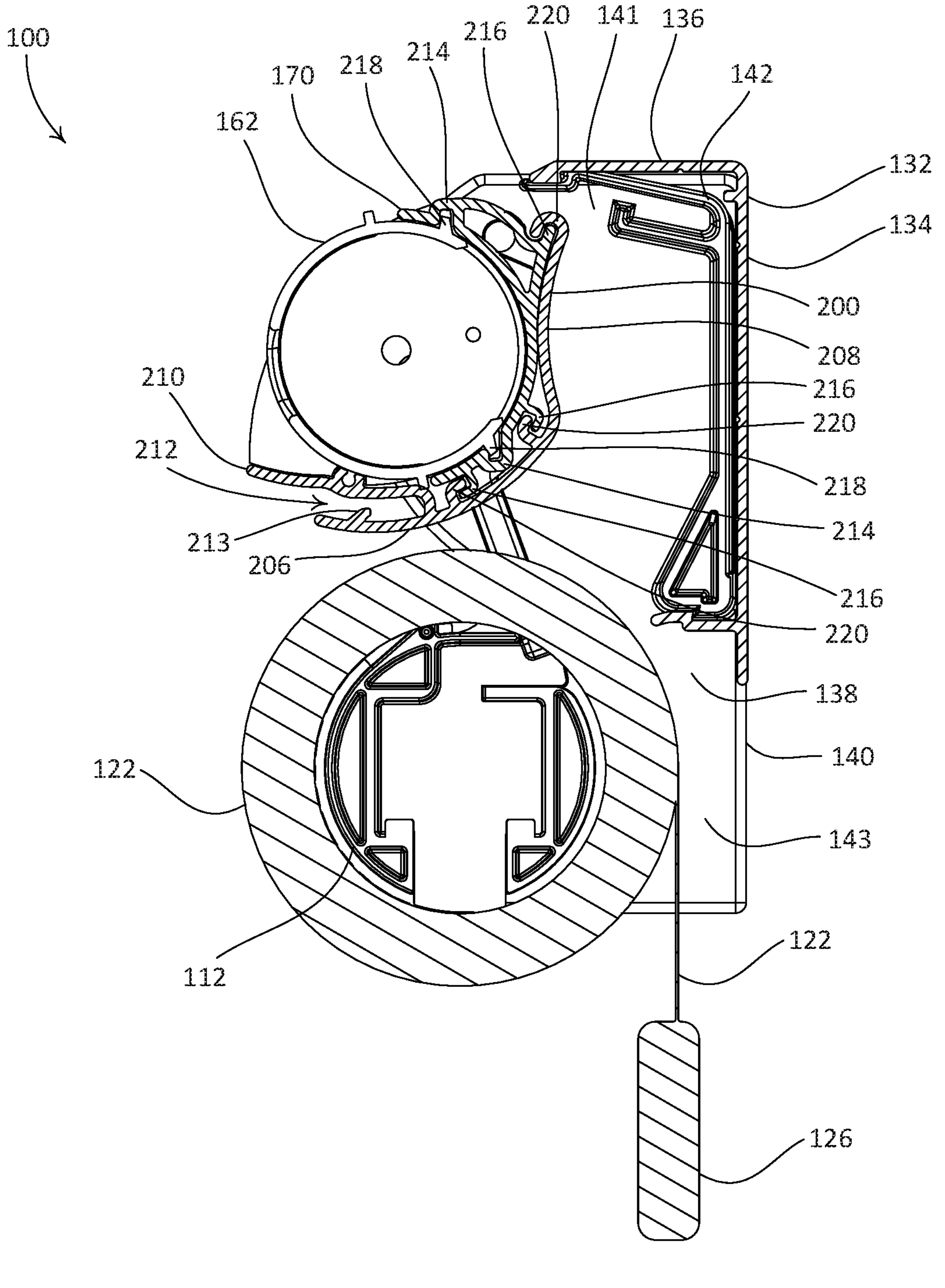
FIG. 1G is a side section view of the example battery-powered roller shade depicted in FIG. 1A, with the shade in the raised position and the battery compartment in an opened position.

The battery holder 162 may define an opening through which a battery 50 may be removed from, or inserted into, the battery holder 162. For example, as shown, the battery holder 162 defines an access aperture 167 through which a battery 50 may be removed from, or inserted into, the channel 166. Stated differently, the battery compartment 160 defines an access aperture 167 through which a battery 50 may be removed from, or inserted into, the battery compartment 160. When the battery compartment 160 is in the closed position, the access aperture 167 may be disposed in the cavity 138 and hidden from view (e.g., as shown in FIG. 1F). When the battery compartment 160 is in the opened position, the access aperture 167 may be external to the cavity 138 and accessible (e.g., as shown in FIG. 1G), such that one or more batteries 50 may be disposed into, or removed from, the battery compartment 160.

The access aperture 167 may be sized such that a battery 50 may be freely inserted through the access aperture 167 and into the battery holder 162 (e.g., with little or no resistance). As shown, the access aperture 167 defines a length, along an axial direction between the first and second ends 164, 165, that is slightly longer than a length of a battery 50 (e.g., as defined between the contacts of the battery 50), and defines a width that is slightly wider than an outer diameter of the battery 50. The illustrated access aperture 167 is located near the second end 165 of the battery holder 162, and near the second end 163 of the battery compartment 160. It should be appreciated, however, that the access aperture 167 may be located elsewhere along the battery holder 162.

When a battery 50 is disposed into the channel 166 of the battery holder 162, the battery 50 may be moved (e.g., slid) between the first and second ends 164, 165 of the battery holder 162. In this regard, the battery holder 162 may be configured for slidable movement of a battery 50 between the first and second ends 164, 165. And more generally, the battery compartment 160 may be configured for slidable movement of a battery 50 between the first and second ends 161, 163.

The battery holder 162 may be configured to allow movement of one or more batteries 50 between the first and second ends 164, 165 of the battery holder 162 while the battery-powered roller shade 100 is in an assembled configuration. As shown, for example, the battery holder 162 defines a slot 168 that is open to the access aperture 167, and that extends along the battery holder 162 toward the first end 164, in the axial direction. Stated differently, the battery compartment 160 defines a slot 168 that is open to the access aperture 167, and that extends along the battery compartment 160 toward the first end 161, in the axial direction. It should be appreciated that the battery holder 162 is not limited to the illustrated configuration of the slot 168.

The slot 168 may define a width (e.g., between opposed edges of the slot 168 along a direction that is normal to the axial direction) that is narrower than the outer diameter of a battery 50, but wide enough to allow an operator of the battery-powered roller shade 100 to slide a battery along the channel 166 between the first and second ends 164, 165 (e.g., using a finger disposed in the slot 168). The width of the slot 168 may be, for example, in the range of about 0.5 inches to about 1.0 inches, such as about 0.75 inches.

The battery holder 162 may be configured to retain a battery 50 that is disposed in the channel 166 and located at the access aperture 167. For example, as shown, the battery holder 162 defines opposed, resilient retention tabs 169 that extend above the access aperture 167. The retention tabs 169 may follow the curvature of the battery holder 162. The retention tabs 169 may be configured to deflect out of the way when a battery 50 is inserted into the battery holder 162, and to resiliently return to respective substantially undeflected positions when the battery 50 is seated in the channel 166, such that the battery 50 is retained in the battery holder 162.

The illustrated support 170 includes a rail 172 that is elongate between a first end 171 and an opposed second end 173, a first support bracket 180, and a second support bracket 190. The rail 172, the first support bracket 180, and the second support bracket 190 may be configured to attach to one another in an assembled configuration. For example, the first support bracket 180 may be configured to be attached to the first end 171 of the rail 172, and the second support bracket 190 may be configured to be attached to the second end 173 of the rail 172. As shown, the first support bracket 180 defines an attachment member 182 that is configured to engage the first end 171 of the rail 172, and the second support bracket 190 defines an attachment member 192 that is configured to engage the second end 173 of the rail 172. It should be appreciated that the rail 172, the first support bracket 180, and the second support bracket 190 are not limited to the illustrated attachment members.

The first support bracket 180 may define a first end 174 of the support 170, and the second support bracket 190 may define a second end 175 of the support 170. The first end 174 of the support 170 may coincide with the first end 161 of the battery compartment 160, and the second end 175 of the support 170 may coincide with the second end 163 of the battery compartment 160. As shown, the support is elongate between the first end 174 and the second end 175.

The first and second ends 174, 175 of the support 170 may be configured to be attached to, and supported by, the housing 130, such that the support 170, and thus the battery compartment 160, is pivotable about the pivot axis P1. For example, as shown, the first support bracket 180 defines an aperture 184 that is configured to receive the post 146 of the first housing bracket 140 of the housing 130. The aperture 184 may be referred to as a first aperture. The second support bracket 190 defines an aperture 194 that is configured to receive the post 156 of the second housing bracket 150 of the housing 130. The aperture 194 may be referred to as a second aperture. When the first and second support brackets 180, 190 are attached to the rail 172 (e.g., when the support 170 is in an assembled configuration), the apertures 184, 194 may be aligned with one another, such that the pivot axis P1 extends through respective centers of the apertures 184, 194. When the first post 146 is disposed in the first aperture 184 and the second post 156 is disposed in the second aperture 194, the battery compartment 160 may be pivoted about the pivot axis P1.

The support 170 may be configured to limit a distance that the battery compartment 160 pivots about the posts 146 and 156. For example, as shown, the first support bracket 180 may define an arc shaped slot 186 that is spaced from the aperture 184, and that is configured to receive the projection 148 of the first housing bracket 140 of the housing 130. The slot 186 may be referred to as a first slot. As shown, the slot 186 has a first end 187 and a second end 189. The second support bracket 190 may define an arc shaped slot 196 that is spaced from the aperture 194, and that is configured to receive the projection 158 of the second housing bracket 150 of the housing 130. The slot 196 may be referred to as a second slot. As shown, the slot 196 has a first end 197 and a second end 199. The slots 186, 196 may be aligned with each other when the support 170 is in an assembled configuration.

The first ends 187, 197 of the slots 186,196 may define a first pivot stop that corresponds to the closed position of the battery compartment 160, such that the projection 148 abuts the first end 187 and the projection 158 abuts the first end 197 when the battery compartment 160 is in the closed position. The second ends 189, 199 of the slot 186, 196 may define a second pivot stop that corresponds to the opened position of the battery compartment 160, such that the projection 148 abuts the second end 189 and the projection 158 abuts the second end 199 when the battery compartment 160 is in the opened position. In this regard, the battery compartment 160 may define a first pivot stop related to the closed position of the battery compartment 160, and may define a second pivot stop related to the opened position of the battery compartment 160.

As shown, the battery compartment 160 is configured to be mechanically bistable with respect to the first and second pivot stops. For example, when the battery compartment 160 is in the closed position, the projections 148 and 158 may abut the first ends 187 and 197, respectively, such that the battery compartment 160 is stable (e.g., at rest with respect to the housing 130). When the battery compartment 160 is in the opened position, the projections 148 and 158 may abut the second ends 189 and 199, respectively, such that the battery compartment 160 is stable (e.g., at rest with respect to the housing 130). Stated differently, the battery compartment 160 is stable in the closed and opened positions, and thus mechanically bistable with respect to the closed and opened positions.

The components of the support 170 may be made of any suitable material or combination of materials. For example, the rail 172 may be made of metal and the first and second support brackets 180, 190 may be made of plastic. Although the illustrated support 170 includes separate components, it should be appreciated that the support 170 may be otherwise constructed. For example, the rail 172, the first support bracket 180, and the second support bracket 190 may be monolithic.

The illustrated cover 200 is elongate between a first end 202 and an opposed second end 204. The first end 202 may coincide with the first end 161 of the battery compartment 160, and second end 204 may coincide with the second end 163 of the battery compartment 160. As shown, the cover 200 includes a curved front wall 206, and a curved lower wall 208. The cover 200 may be configured to at least partially enclose the battery holder 162. For example, as shown, the front wall 206 and the lower wall 208 at partially enclose the battery holder 162. The illustrated front wall 206 defines an upper edge 210, and defines a groove 212 that extends away from the upper edge 210. As shown, the front wall 206 may define a projection 213 that extends into the groove 212.

When the battery compartment 160 is supported by the housing 130 and is in the closed position, the front wall 206 may exhibit convex curvature relative to the rear wall 134 of the housing 130, and the lower wall 208 may exhibit concave curvature relative to the upper wall 136 of the housing 130. The curvature of the lower wall 208 may be configured to follow that of the shade fabric 122 when the shade fabric 122 is in the raised position, such that the lower wall 208 does not interfere with operation of the shade assembly 110 (e.g., does not make contact with the roller tube 112 or material of the shade fabric 122 that is wound onto the roller tube 112).

The cover 200 may be configured to conceal the battery holder 162 and the support 170, and to at least partially conceal the cavity 138. For example, when the battery compartment 160 is in the closed position, the front wall 206 may conceal the battery holder 162, one or more batteries 50 disposed in the battery holder 162, and one or more portions of the cavity 138 and/or the housing 130 that may otherwise be visible if the cover 200 was absent. When the battery compartment 160 is in the closed position and the shade fabric 122 is lowered (e.g., to the lowered position), the lower wall 208 may conceal the battery holder 162 and one or more portions of the cavity 138 and/or the housing 130 that may otherwise be visible if the cover 200 was absent. The cover 200 may be made of any suitable material, such as plastic. The cover 200 may be wrapped in a material (e.g., fabric), for instance to enhance the aesthetics of the cover 200.

The battery holder 162, the support 170, and the cover 200, may be configured to be attached to one another, for example when the battery compartment 160 is in an assembled configuration. In an assembled configuration of the battery compartment 160, the battery holder 162 may be attached to the support 170, and the cover 200 may be attached to the support 170. In this regard, it may be said that the support 170 attaches the cover 200 to the battery holder 162 (e.g., indirectly).

In accordance with the illustrated battery compartment 160, the battery holder 162, the support 170, and the cover 200 may define respective complementary attachment members (e.g., as shown in FIGS. 1F and 1G). For example, the support 170 may define first attachment members 214 that are configured to engage complementary attachment members of the battery holder 162, and second attachment members 216 that are configured to engage with complementary attachment members of the cover 200. The battery holder 162 may define attachment members 218 that are configured to engage with the first attachment members 214 of the support 170. The cover 200 may define attachment members 220 that are configured to engage with the second attachment members 216 of the support 170.

As shown, the attachment members 218 of the battery holder 162 are configured as projections, and the first attachment members 214 of the support are configured as receptacles that are configured to receive and engage the projections. As shown, the attachment members 220 of the cover 200 and the second attachment members 216 of the support 170 are respectively configured as complementary hooks that are configured to engage one another. It should be appreciated that the components of the battery compartment 160 are not limited to the illustrated attachment members, and that one or more of the battery holder 162, the support 170, or the cover 200 may be alternatively configured with any suitable number and configuration of attachment members to facilitate attachment of the components to one another.

In an example of operating the battery compartment 160 of the battery-powered roller shade 100 from the closed position to the opened position, a force may be applied to the battery compartment 160 (e.g., to upper edge 210 of the front wall 206 of the cover 200) to cause the battery compartment 160 to pivot about the posts 146, 156 of the housing 130. As the battery compartment 160 pivots out of the cavity 138 about the pivot axis P1, the projections 148, 158 of the housing 130 move in the slots 186, 196 of the support 170 (e.g., from the first ends 187, 197 toward the second ends 189, 199, respectively), and the battery holder 162 gradually becomes exposed. As the battery compartment 160 pivots into the opened position, the projections 148, 158 may abut the second ends 189, 199 of the slots 186, 196. With the battery compartment 160 in the opened position (e.g., as shown in FIG. 1G), the access aperture 167 and the slot 168 are exposed, such that one or more batteries 50 may be inserted into, or removed from, the channel 166 (e.g., via the access aperture 167).

With the battery compartment 160 in the opened position, one or more batteries 50 may be replaced (e.g., if the batteries 50 are drained). A first battery 50 that is disposed at the access aperture 167 may be removed from the channel 166 by lifting the first battery 50 out of the channel 166 past the retention tabs 169. At the access aperture 167, one battery 50 at a time may be removed from the battery compartment 160, and thus from the housing 130 of the battery-powered roller shade 100, without interfering with the housing 130, the roller tube 112, or the shade fabric 122. With the first battery 50 removed, a second battery 50 may be removed from the channel 166 by sliding the second battery 50 along the channel 166 toward the access aperture 167 (e.g., by using a finger disposed in the slot 168). When the second battery 50 reaches the access aperture 167, it may be removed from the channel 166 similarly to the first battery 50. This process may be repeated for one or more additional batteries 50 (e.g., all six batteries 50). When a desired number of batteries 50 have been removed from the channel 166, one or more fresh batteries 50 (e.g., replacement batteries) may be disposed into the channel 166 past the retention tabs 169 and slid into position in the battery holder 162 (e.g., using the slot 168). When the battery holder 162 is filled with batteries 50, the battery compartment 160 may be operated from the opened position to the closed position.

In an example of operating the battery compartment 160 of the battery-powered roller shade 100 from the opened position to the closed position, a force may be applied to the battery compartment 160 (e.g., to the cover 200) to cause the battery compartment 160 to pivot about the posts 146, 156 of the housing 130. As the battery compartment 160 pivots into the cavity 138 about the pivot axis P1, the projections 148, 158 of the housing 130 move in the slots 186, 196 of the support 170 (e.g., from the second ends 189, 199 toward the first ends 187, 197, respectively), and the battery holder 162 is gradually concealed in the housing 130. As the battery compartment 160 pivots into the closed position (e.g., as shown in FIG. 1F), the projections 148, 158 may abut the first ends 187, 197 of the slots 186, 196.

The battery compartment 160 may be easily operated between the closed and opened positions. For example, an individual may operate the battery compartment 160 between the opened and closed positions using a single hand. Additionally, one or more batteries 50 may be removed from, or inserted into, the battery compartment 160 using a single hand. Such one-handed operation of the battery compartment 160 may enable the individual to freely use their other hand while replacing one or more batteries 50, for instance to brace himself or herself on a ladder.

FIGS. 2A-2F depict another example battery-powered roller shade 300. As shown, the battery-powered roller shade 300 includes the shade assembly 110, the battery compartment 160, the housing 130, and a fascia 330.

The fascia 330 may be configured to conceal one or more components of the battery-powered roller shade 300, for instance when the battery compartment 160 is in the closed position. For example, as shown, the fascia 330 may be operably attached to the battery compartment 160, and may be configured to conceal the roller tube 112, a portion of the shade fabric 122 that is wound onto the roller tube 112, the battery compartment 160, and one or more portions of the housing 130 when the battery compartment 160 is in the closed position. In this regard, the fascia 330 may be configured to conceal the cavity 138 when the battery compartment 160 is in the closed position.

As shown, the fascia 330 includes a cover 332 that is elongate between a first end 331 and an opposed second end 333, a first end cap 350, and a second end cap 360. The cover 332, the first end cap 350, and the second end cap 360 may be configured to attach to one another in an assembled configuration. For example, the first end cap 350 may be configured to be attached to the first end 331 of the cover 332, and the second end cap 360 may be configured to be attached to the second end 333 of the cover 332. As shown, the first end cap 350 defines an attachment member 352 that is configured to engage the first end 331 of the cover 332, and the second end cap 360 defines an attachment member 362 that is configured to engage the second end 333 of the cover 332. It should be appreciated that the cover 332, the first end cap 350, and the second end cap 360 are not limited to the illustrated attachment members.

The illustrated cover 332 includes an upper wall 334, a curved front wall 338 that extends from the upper wall 334 to a lower end 339, and a curved support wall 340 that extends from the upper wall 334 to the front wall 338. As shown, the upper wall 334 defines a first section 335, a second section 336, and an intermediate section 337. The first and second sections 335, 336 may be configured to be inflexible, and the intermediate section 337 may be configured to be flexible. As shown, the intermediate section 337 is thinned relative to the first and second sections 335, 336, such that the intermediate section 337 operates as a living hinge. The second section 336 may define a first end at the intermediate section, and an opposed free end. As shown, the free end of the second section 336 defines a projection 342 that is configured to be received in the groove 212 of the cover 200, and retained in the groove 212 by the projection 213.

Figure 2A:
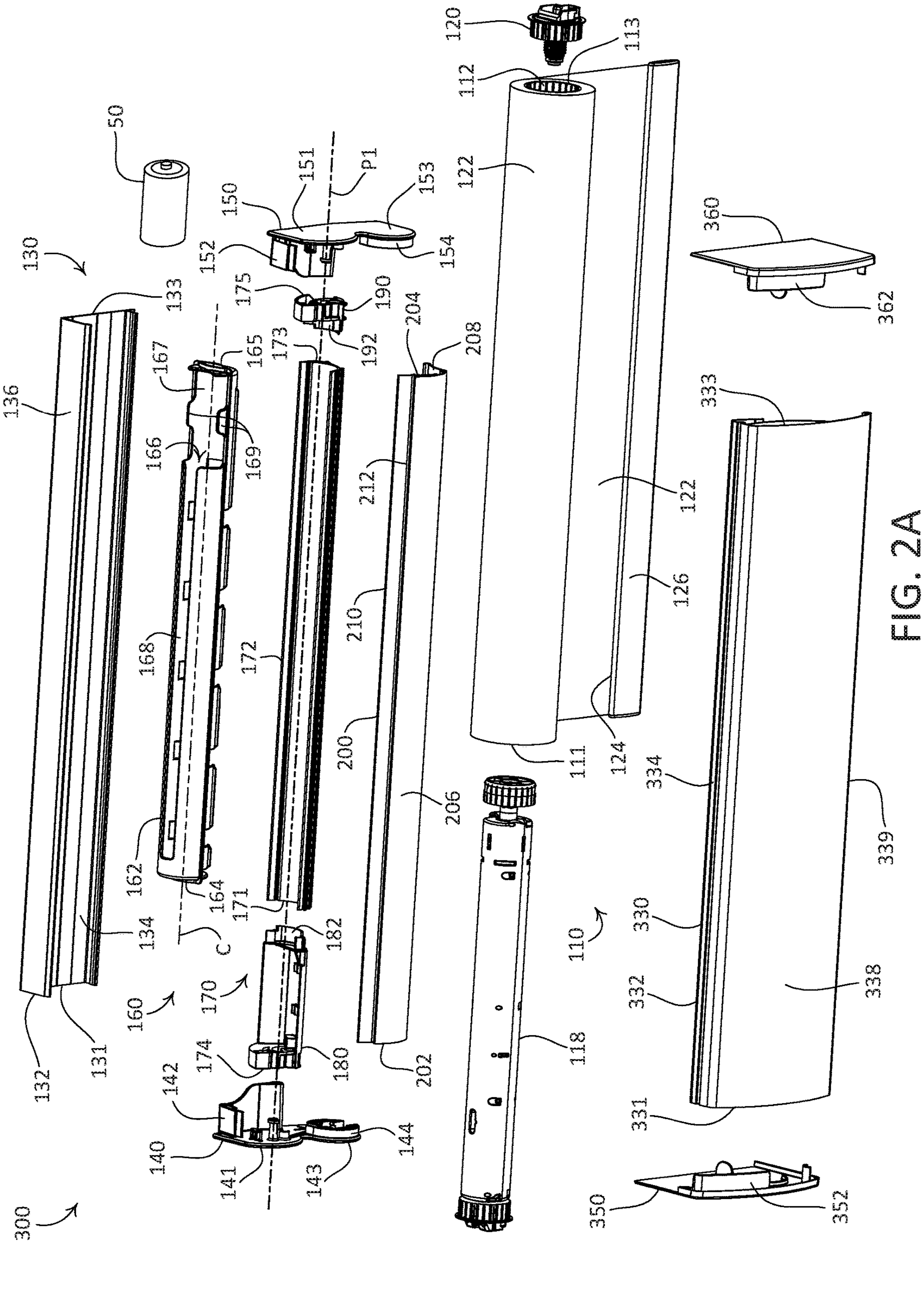
FIG. 2A is an exploded view of another example battery-powered roller shade having an integrated, accessible battery compartment and an example fascia.
Figure 2B:
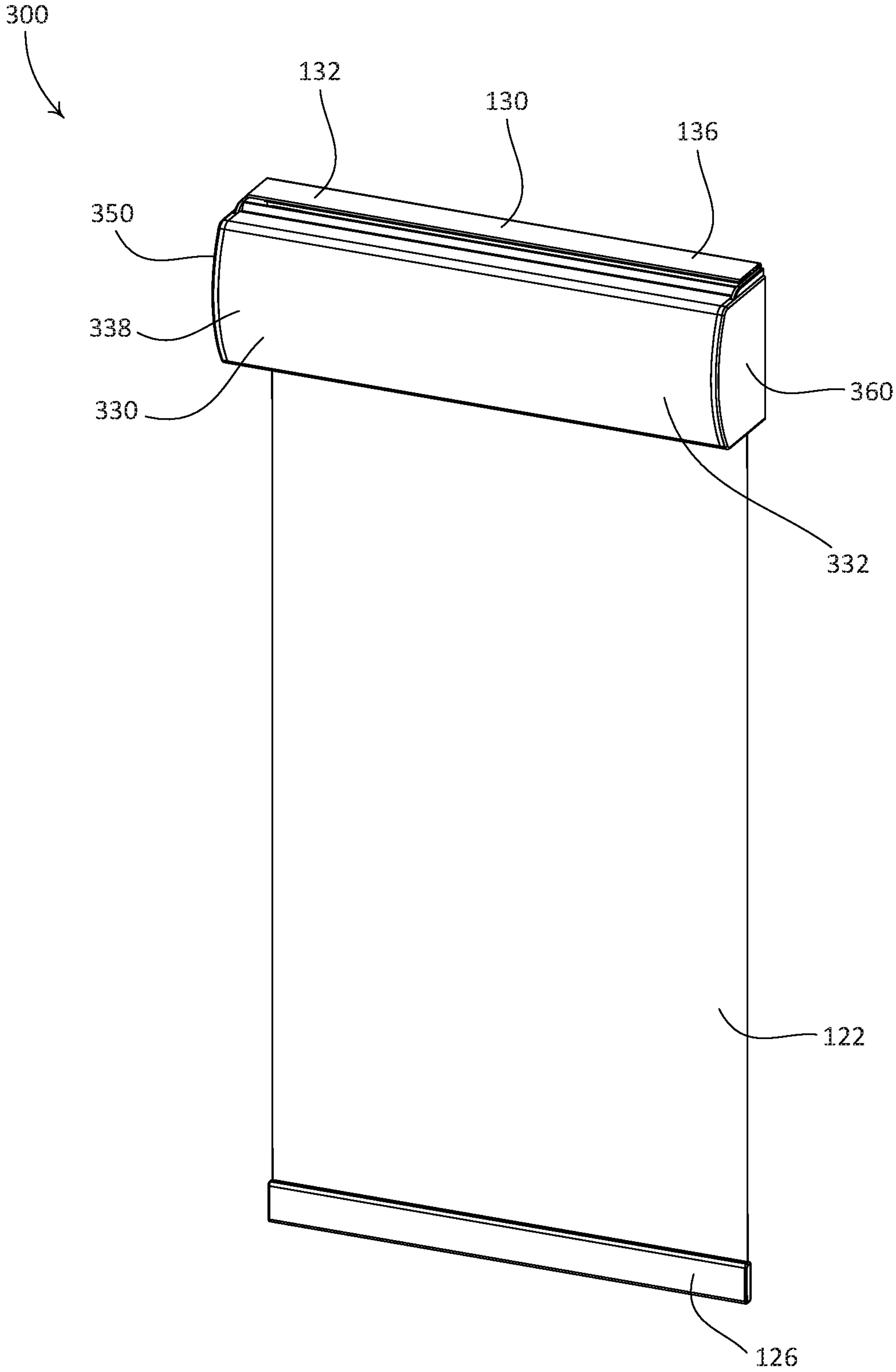
FIG. 2B is a perspective view of the example battery-powered roller shade depicted in FIG. 2A, with the shade in the lowered position, the battery compartment in a closed position, and the fascia raised.
Figure 2C:
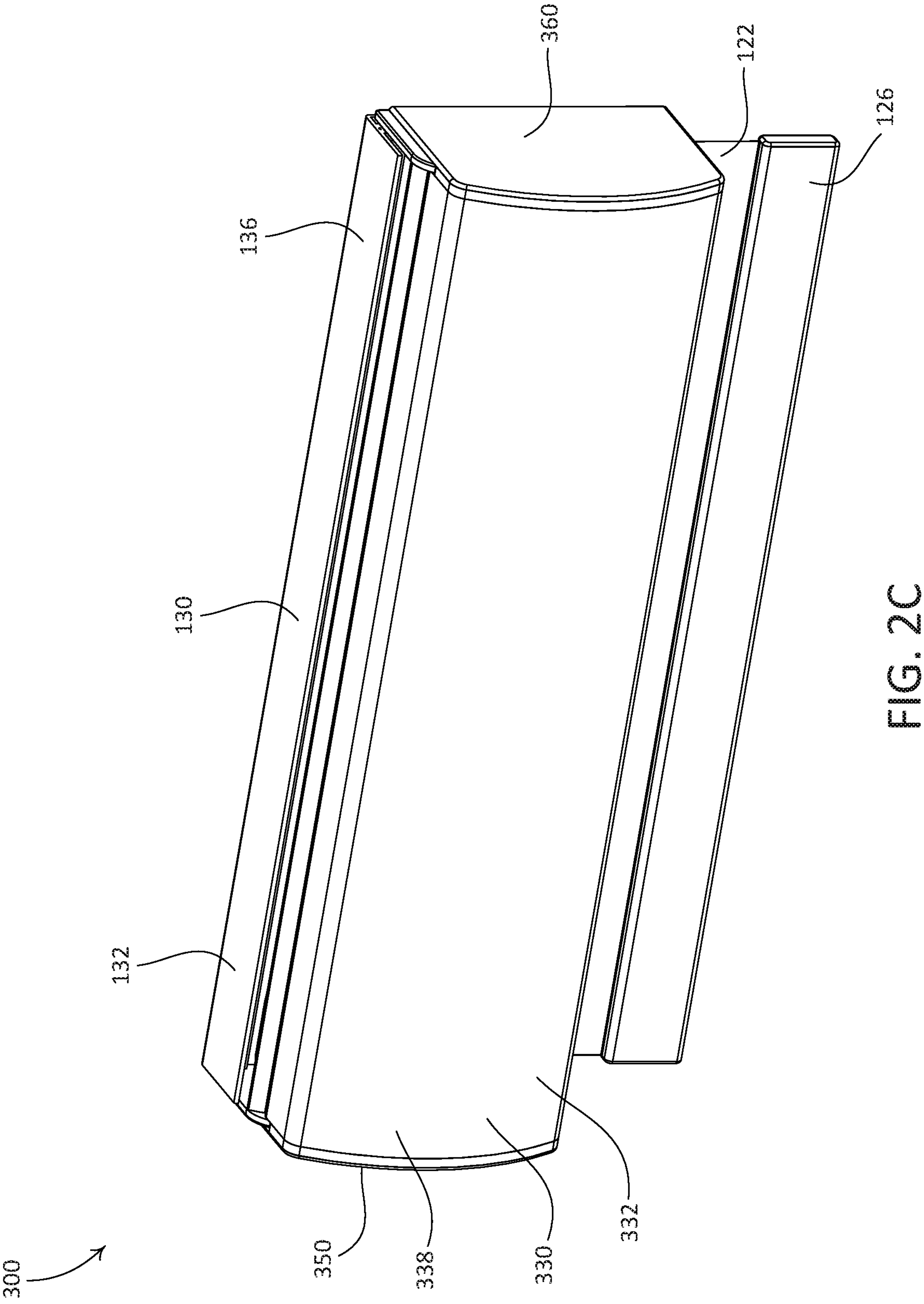
FIG. 2C is a perspective view of the example battery-powered roller shade depicted in FIG. 2A, with the shade in the raised position, the battery compartment in a closed position, and the fascia raised.
Figure 2D:
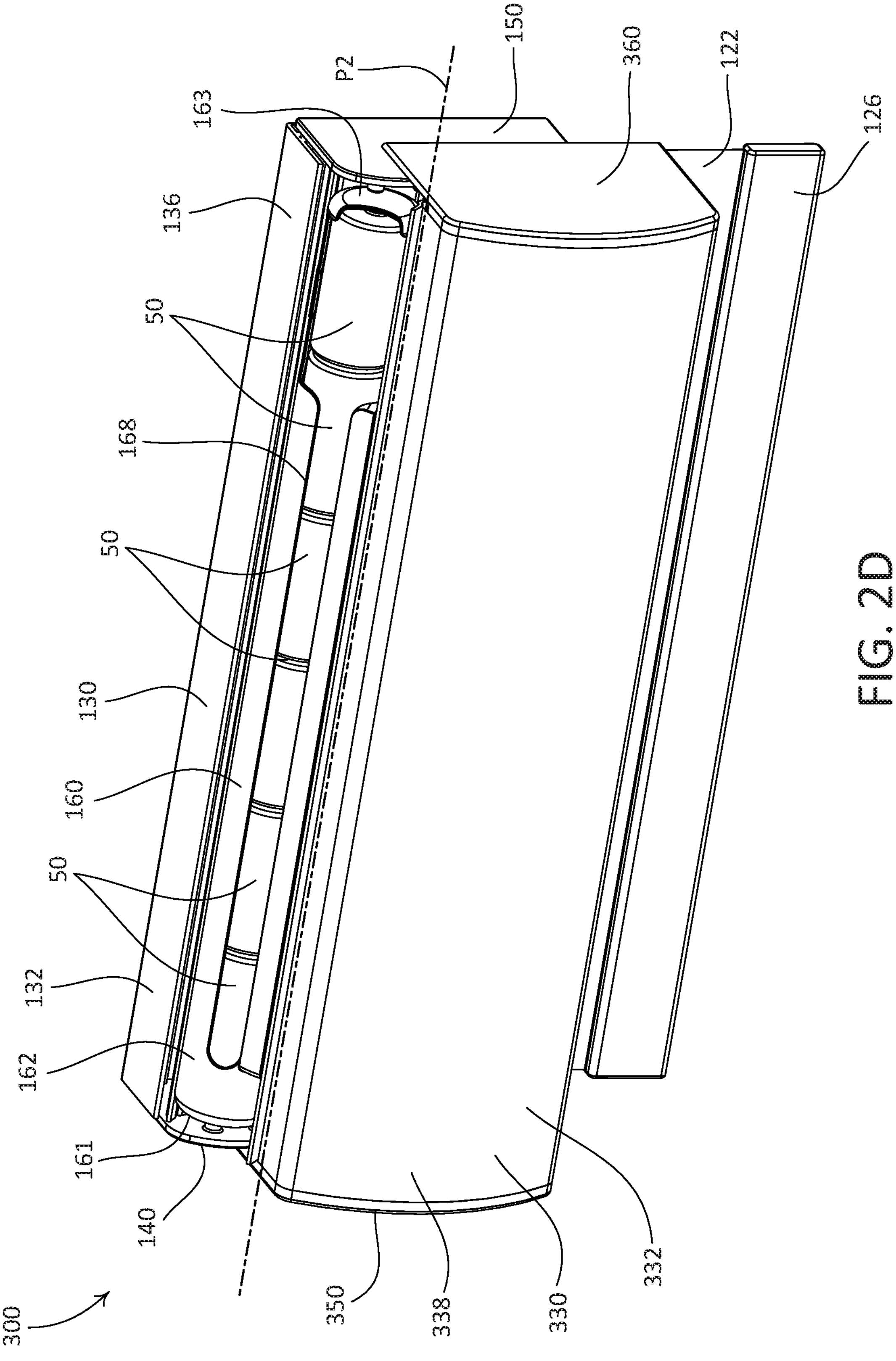
FIG. 2D is a perspective view of the example battery-powered roller shade depicted in FIG. 2A, with the shade in the raised position, the battery compartment in an opened position, and the fascia lowered.
Figure 2E:
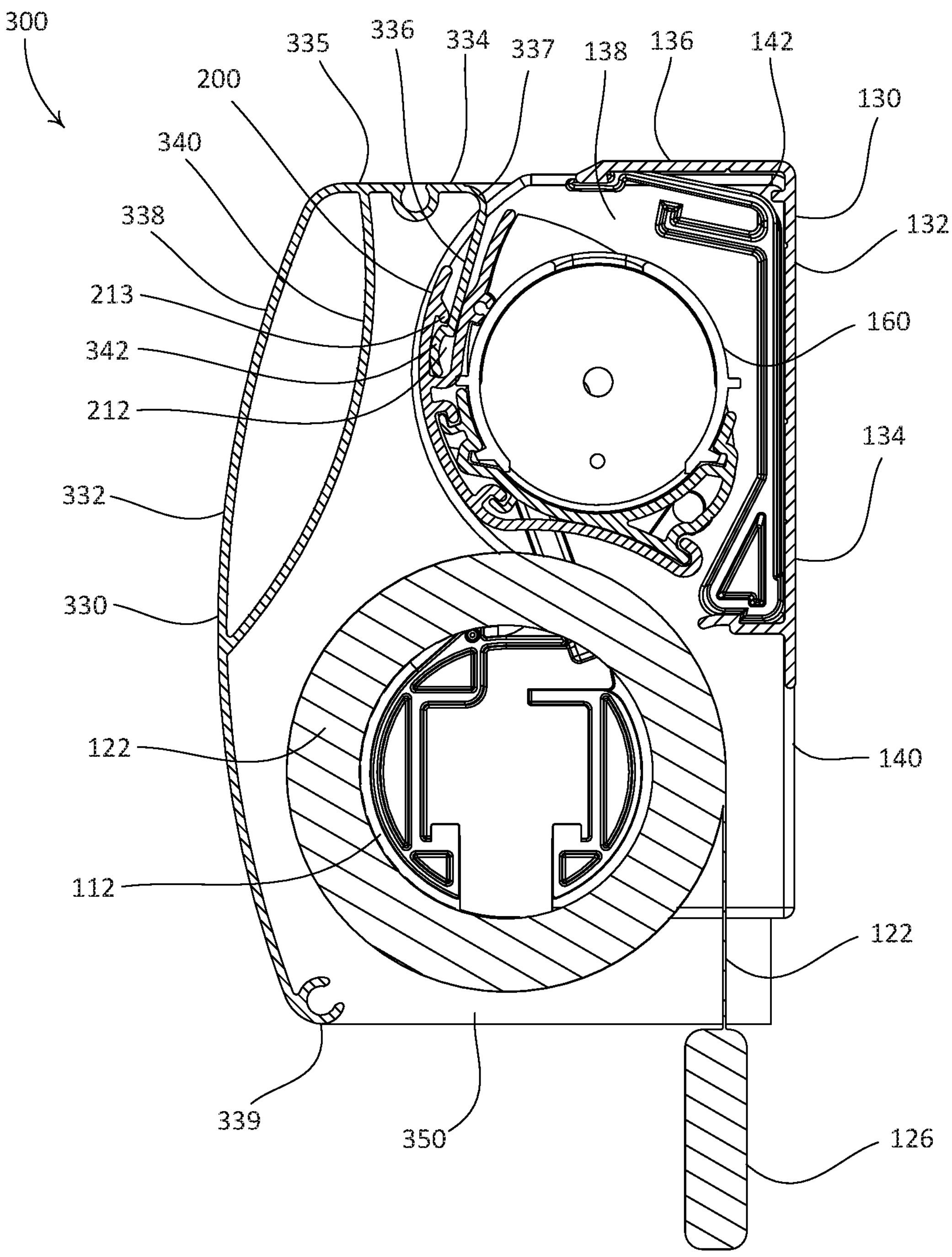
FIG. 2E is a side section view of the example battery-powered roller shade depicted in FIG. 2A, with the shade in the raised position, the battery compartment in a closed position, and the fascia raised.

As shown, the front wall 338 has a height (e.g., as defined by the upper wall 334 and the lower end 339) such that the lower end 339 extends below the roller tube 112 and the portion of the shade fabric 122 that is wound onto the roller tube 112 when the shade fabric 122 is in the raised position (e.g., as shown in FIG. 2E). As shown, the first and second end caps 350, 360 may conform to the curvature of the front wall 338, and may be configured to cover the first and second housing brackets 140, 150, respectively, of the housing 130 when the battery compartment 160 is in the closed position. It should be appreciated that the fascia 330 is not limited to the illustrated curvature and/or height of the front wall 338, or to the respective configurations of the first and second end caps 350, 360.

The fascia 330 may be operably attached to the battery compartment 160. For example, when the projection 342 is disposed in the groove 212 of the cover 200, the projection 213 of the cover 200 abuts the projection 342 of the fascia 330, such that the second section 336 of the upper wall 334 is fixed relative to the cover 200. With the second section 336 of the upper wall 334 fixed relative to the cover 200, the intermediate section 337 may define a pivot axis P2 about which the first section 335 of the upper wall 334 and the front wall 338 may pivot. The pivot axis P2 may be referred to as a second pivot axis. When the battery compartment 160 is in the closed position, the first section 335 of the upper wall 334 may be substantially parallel to the upper wall 136 of the housing 130 (e.g., as shown in FIG. 2E).

The components of the fascia 330 may be made of any suitable material or combination of materials. For example, the cover 332, the first end cap 350, and the second end cap 360 may be made of plastic. Although the illustrated fascia 330 includes separate components, it should be appreciated that the fascia 330 may be otherwise constructed. For example, the cover 332, the first end cap 350, and the second end cap 360 may be monolithic. One or more components of the fascia 330 (e.g., one or more of the cover 332, the first end cap 350, or the second end cap 360) may be wrapped in a material (e.g., fabric), for instance to enhance the aesthetics of the fascia 330.

Figure 2F:
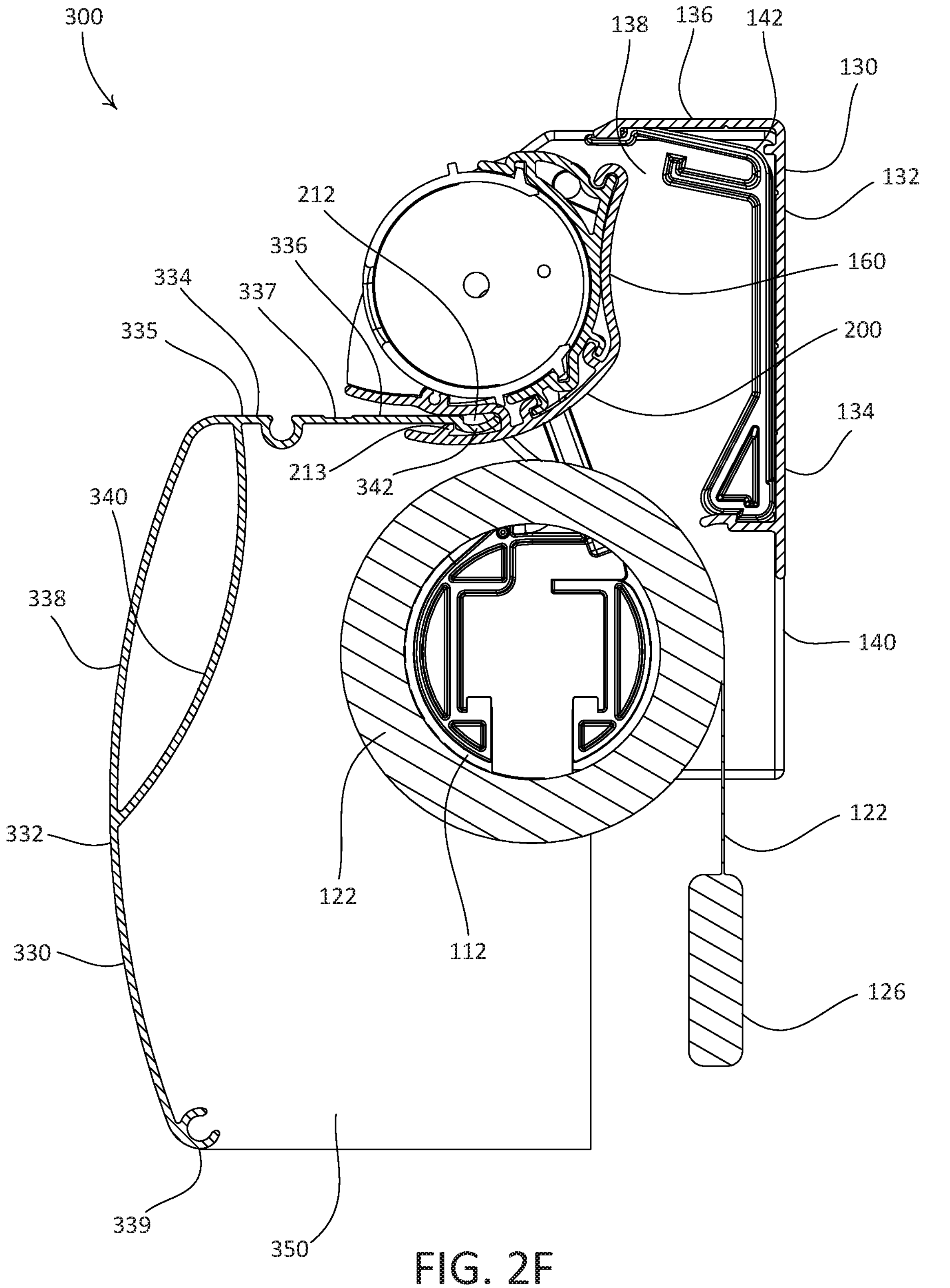
FIG. 2F is a side section view of the example battery-powered roller shade depicted in FIG. 2A, with the shade in the raised position, the battery compartment in an opened position, and the fascia lowered.

In an example of operating the battery compartment 160 of the battery-powered roller shade 300 from the closed position to the opened position, a force may be applied to the battery compartment 160 (e.g., to the cover 332 of the fascia 330 and/or to the upper edge 210 of the front wall 206 of the cover 200) to cause the battery compartment 160 to pivot about the posts 146, 156 of the housing 130. As the battery compartment 160 pivots out of the cavity 138 about the pivot axis P1, the projections 148, 158 of the housing 130 move in the slots 186, 196 of the support 170 (e.g., from the first ends 187, 197 toward the second ends 189, 199, respectively), and the battery holder 162 gradually becomes exposed. As the battery compartment 160 pivots forward about the pivot axis P1, the first section 335 of the upper wall 334 and the front wall 338 of the fascia 330 pivot downward and away from the battery compartment 160 about the pivot axis P2, such that the fascia 330 does not contact the roller tube 112 or the shade fabric 122. As the battery compartment 160 pivots into the opened position, the projections 148, 158 may abut the second ends 189, 199 of the slots 186, 196. With the battery compartment 160 in the opened position (e.g., as shown in FIG. 2F), the access aperture 167 and the slot 168 are exposed, such that one or more batteries 50 may be inserted into, or removed from, the channel 166 (e.g., via the access aperture 167).

With the battery compartment 160 in the opened position, one or more batteries 50 may be replaced (e.g., if the batteries 50 are drained). A first battery 50 that is disposed at the access aperture 167 may be removed from the channel 166 by lifting the first battery 50 out of the channel 166 past the retention tabs 169. At the access aperture 167, one battery 50 at a time may be removed from the battery compartment 160, and thus from the housing 130 of the battery-powered roller shade 300, without interfering with the housing 130, the roller tube 112, or the shade fabric 122. With the first battery 50 removed, a second battery 50 may be removed from the channel 166 by sliding the second battery 50 along the channel 166 toward the access aperture 167 (e.g., by using a finger disposed in the slot 168). When the second battery 50 reaches the access aperture 167, it may be removed from the channel 166 (e.g., similarly to the first battery 50). This process of removing the second battery 50 may be repeated for one or more additional batteries 50 (e.g., all remaining batteries 50). When a desired number of batteries 50 have been removed from the channel 166, one or more fresh batteries 50 (e.g., replacement batteries) may be disposed into the channel 166 past the retention tabs 169 and slid into position in the battery holder 162 (e.g., using the slot 168). When the battery holder 162 is filled with batteries 50, the battery compartment 160 may be operated from the opened position to the closed position.

In an example of operating the battery compartment 160 from the opened position to the closed position, a force may be applied to the battery compartment 160 (e.g., to the cover 332 of the fascia 330 and/or to the upper edge 210 of the front wall 206 of the cover 200) to cause the battery compartment 160 to pivot about the posts 146, 156 of the housing 130. As the battery compartment 160 pivots into the cavity 138 about the pivot axis P1, the projections 148, 158 of the housing 130 move in the slots 186, 196 of the support 170 (e.g., from the second ends 189, 199 toward the first ends 187, 197, respectively), and the battery holder 162 is gradually concealed in the housing 130. As the battery compartment 160 pivots rearward about the pivot axis P1, the first section 335 of the upper wall 334 and the front wall 338 of the fascia 330 pivot upward and toward the battery compartment 160 about the pivot axis P2, and the first and second end caps 350, 360, slide past the first and second housing brackets 140, 150 respectively. As the battery compartment 160 pivots into the closed position, the projections 148, 158 may abut the first ends 187, 197 of the slots 186, 196.

The battery compartment 160 may be easily operated between the closed and opened positions. For example, an individual may operate the battery compartment 160 between the opened and closed positions using a single hand. Additionally, one or more batteries 50 may be removed from, or inserted into, the battery compartment 160 using a single hand. Such one-handed operation of the battery compartment 160 may enable the individual to freely use their other hand while replacing one or more batteries 50, for instance to brace himself or herself on a ladder.

FIGS. 3A-3F depict another example battery-powered roller shade 400. As shown, the battery-powered roller shade 400 includes the shade assembly 110, the housing 130, a battery compartment 460, and a fascia 430.

The illustrated battery compartment 460 is elongate between a first end 461 and an opposed second end 463. The battery compartment 460 may be configured to hold one or more batteries 50, for example in a linear (e.g., coaxial) arrangement between the first and second ends 461, 463. The battery compartment 460 may be in electrical communication with one or more electrical components of the battery-powered roller shade 400 (e.g., similarly to the battery-powered roller shade 100).

As shown, the battery compartment 460 includes the battery holder 162, the support 170, and a cover 500. The battery holder 162, the support 170, and the cover 500 may be configured to be attached to one another, for example when the battery compartment 460 is in an assembled configuration.

The illustrated cover 500 is elongate between a first end 502 and an opposed second end 504. The first end 502 may coincide with the first end 461 of the battery compartment 460, and second end 504 may coincide with the second end 463 of the battery compartment 460. As shown, the cover 500 includes a curved front wall 506, and a curved lower wall 508. The cover 500 may be configured to at least partially enclose the battery holder 162. For example, as shown, the front wall 506 and the lower wall 508 at partially enclose the battery holder 162. The illustrated front wall 506 defines an upper edge 510, and defines a recess 512 near the upper edge 510 (e.g., slightly below the upper edge 510).

When the battery compartment 460 is supported by the housing 130 and is in the closed position, the front wall 506 may exhibit convex curvature relative to the rear wall 134 of the housing 130, and the lower wall 508 may exhibit concave curvature relative to the upper wall 136 of the housing 130. The curvature of the lower wall 508 may be configured to follow that of the shade fabric 122 when the shade fabric 122 is in the raised position, such that the lower wall 508 does not interfere with operation of the shade assembly 110 (e.g., does not make contact with the roller tube 112 or material of the shade fabric 122 that is wound onto the roller tube 112).

The cover 500 may be configured to conceal the battery holder 162 and the support 170, and to at least partially conceal the cavity 138. For example, when the battery compartment 460 is in the closed position, the front wall 506 may conceal the battery holder 162, one or more batteries 50 disposed in the battery holder 162, and one or more portions of the cavity 138 and/or the housing 130 that may otherwise be visible if the cover 500 was absent. When the battery compartment 460 is in the closed position and the shade fabric 122 is lowered (e.g., to the lowered position), the lower wall 508 may conceal the battery holder 162 and one or more portions of the cavity 138 and/or the housing 130 that may otherwise be visible if the cover 500 was absent. The cover 500 may be made of any suitable material, such as plastic. The cover 500 may be wrapped in a material (e.g., fabric), for instance to enhance the aesthetics of the cover 500.

The battery holder 162, the support 170, and the cover 500, may be configured to be attached to one another, for example when the battery compartment 460 is in an assembled configuration. In an assembled configuration of the battery compartment 460, the battery holder 162 may be attached to the support 170, and the cover 500 may be attached to the support 170. In this regard, it may be said that the support 170 attaches the cover 500 to the battery holder 162 (e.g., indirectly).

The cover 500 may define attachment members 222 that are configured to engage with the second attachment members 216 of the support 170. As shown, the attachment members 222 of the cover 500 and the second attachment members 216 of the support 170 are respectively configured as complementary hooks that are configured to engage one another. It should be appreciated that the components of the battery compartment 460 are not limited to the illustrated attachment members, and that one or more of the battery holder 162, the support 170, or the cover 500 may be alternatively configured with any suitable number and configuration of attachment members to facilitate attachment of the components to one another.

The fascia 430 may be configured to conceal one or more components of the battery-powered roller shade 400, for instance when the battery compartment 460 is in the closed position. For example, as shown, the fascia 430 may be operably attached to the battery compartment 460, and may be configured to conceal the roller tube 112, a portion of the shade fabric 122 that is wound onto the roller tube 112, the battery compartment 460, and one or more portions of the housing 130 when the battery compartment 460 is in the closed position. In this regard, the fascia 430 may be configured to conceal the cavity 138 when the battery compartment 460 is in the closed position.

As shown, the fascia 430 includes a cover 432 that is elongate between a first end 431 and an opposed second end 433, a first end cap 470, and a second end cap 480. The cover 432, the first end cap 470, and the second end cap 480 may be configured to attach to one another in an assembled configuration. For example, the first end cap 470 may be configured to be attached to the first end 431 of the cover 432, and the second end cap 480 may be configured to be attached to the second end 433 of the cover 432. As shown, the first end cap 470 defines an attachment member 472 that is configured to engage the first end 431 of the cover 432, and the second end cap 480 defines an attachment member 482 that is configured to engage the second end 433 of the cover 432. It should be appreciated that the cover 432, the first end cap 470, and the second end cap 480 are not limited to the illustrated attachment members.

The illustrated cover 432 includes an upper wall 434, a lower wall 436 that is spaced from the upper wall 434, and a curved front wall 438 that extends from the upper wall 434 to the lower wall 436. The upper wall 434 may extend rearward from the front wall 438 to a rear end 440 that is spaced from the front wall 438.

The fascia 430 may be operably attached to the battery compartment 460. For example, the fascia 430 may be configured to be pivotally coupled to the cover 500 of the battery compartment 460. As shown, the rear end 440 of the upper wall 434 defines a projection 442 that is configured to be received in the recess 512 of the front wall 506 of the cover 500. When the projection 442 is disposed in the recess 512 (e.g., snapped into the recess 512) of the cover 500, the projection 442 and the recess 512 may operate as a hinge, and may define a pivot axis P2 about which the fascia 430 may pivot. The pivot axis P2 may be referred to as a second pivot axis. As shown, the projection 442 is defined along the length of the rear end 440 of the upper wall 434 (e.g., as defined by the first and second ends 431, 433), and the recess 512 is defined along the length of the cover 500 (e.g., as defined by the first and second ends 502, 504). When the battery compartment 460 is in the closed position, the upper wall 443 may be substantially parallel to the upper wall 136 of the housing 130 (e.g., as shown in FIG. 3E).

It should be appreciated that the fascia 430 and the cover 500 are not limited to the illustrated hinged configuration. For example, the fascia 430 and the cover 500 may be alternatively configured such that the fascia 430 defines a recess and the cover 500 defines a projection that is configured to be received in the recess. In another example, the fascia 430 and the cover 500 may be alternatively configured to define multiple pairs of projections 442 and recesses 512 at spaced locations along the fascia 430 and the cover 500, respectively.

Figure 3A:
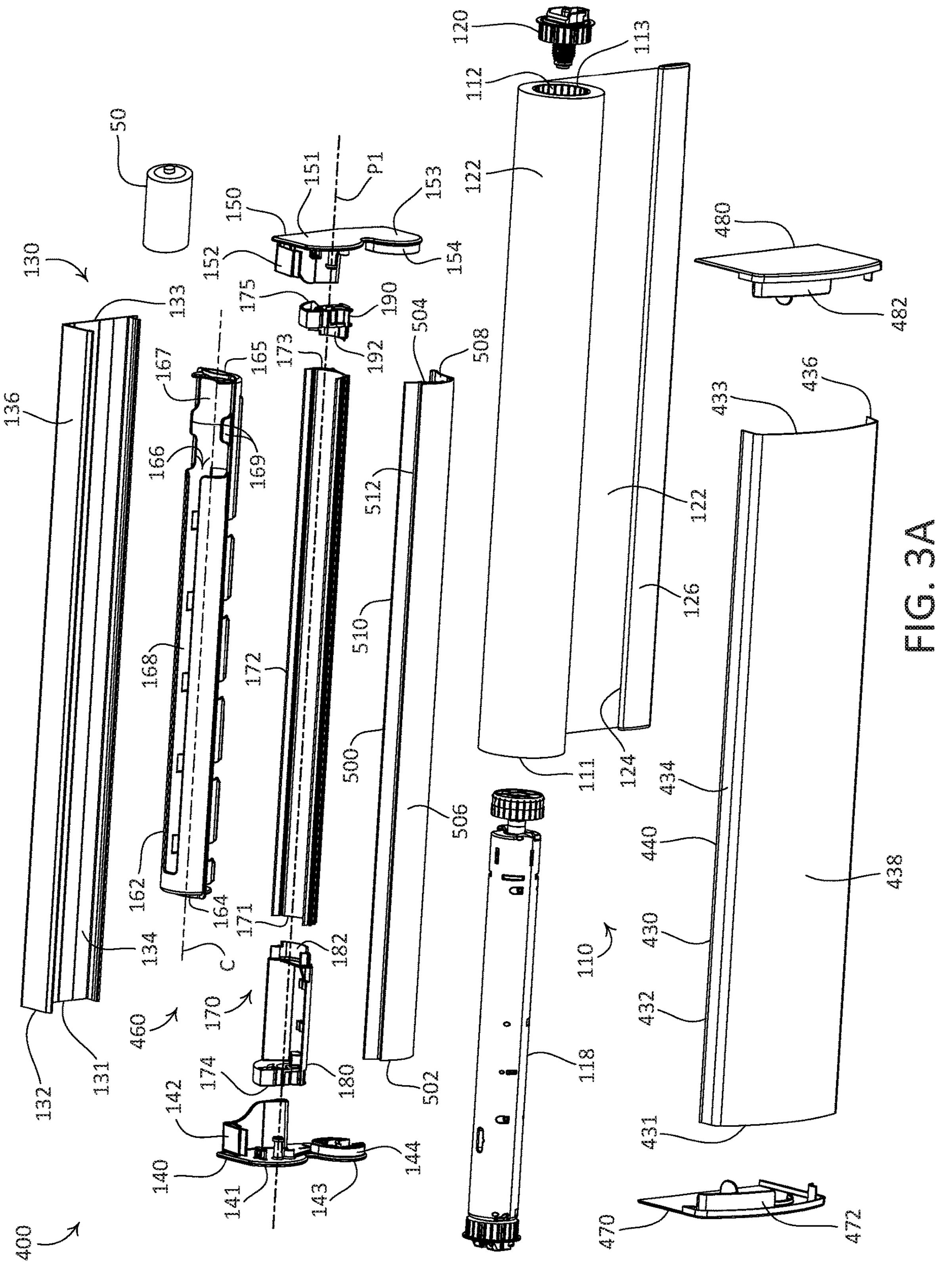
FIG. 3A is an exploded view of another example battery-powered roller shade having an integrated, accessible battery compartment and another example fascia.
Figure 3B:
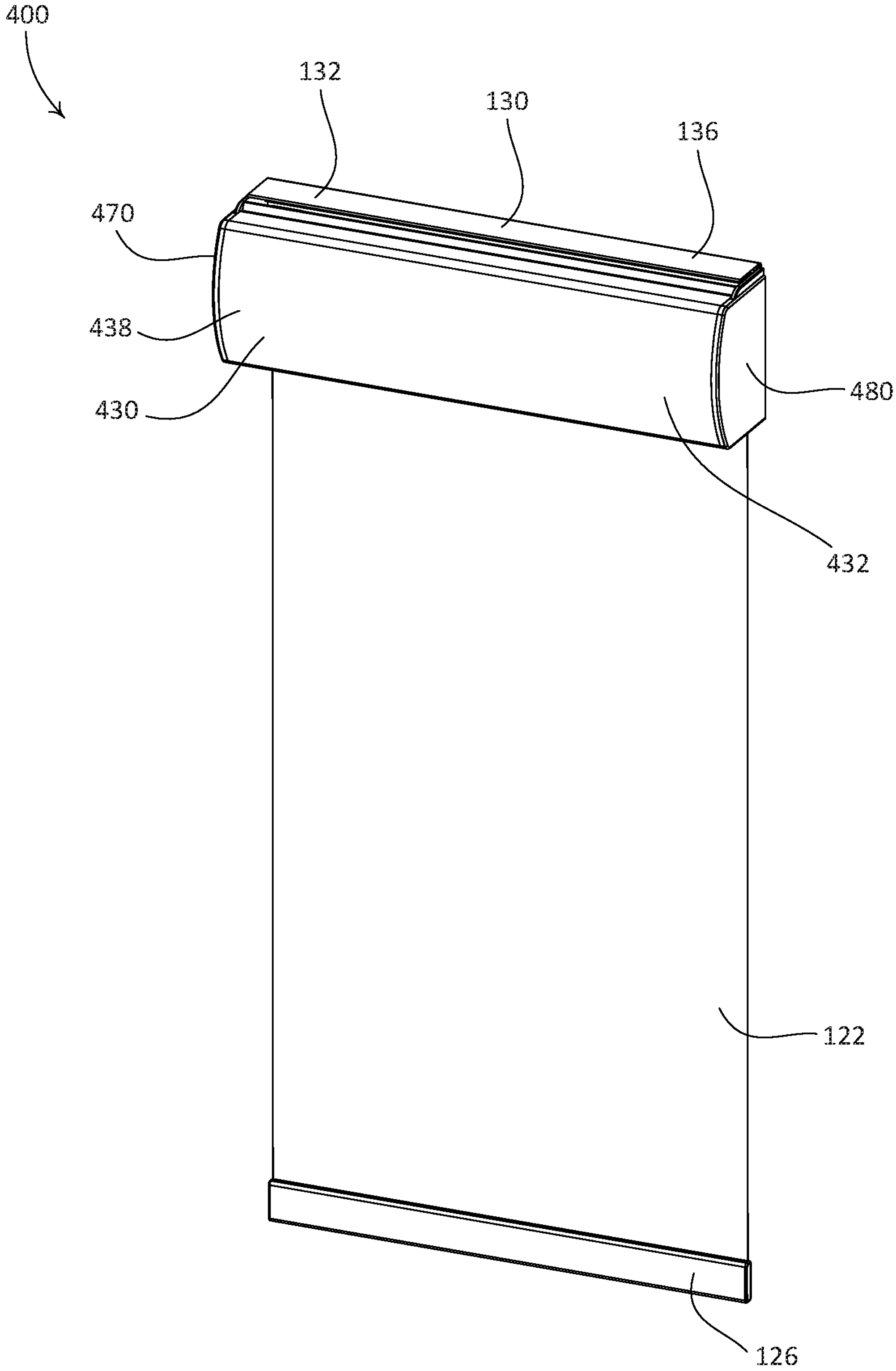
FIG. 3B is a perspective view of the example battery-powered roller shade depicted in FIG. 3A, with the shade in the lowered position, the battery compartment in a closed position, and the fascia raised.
Figure 3C:
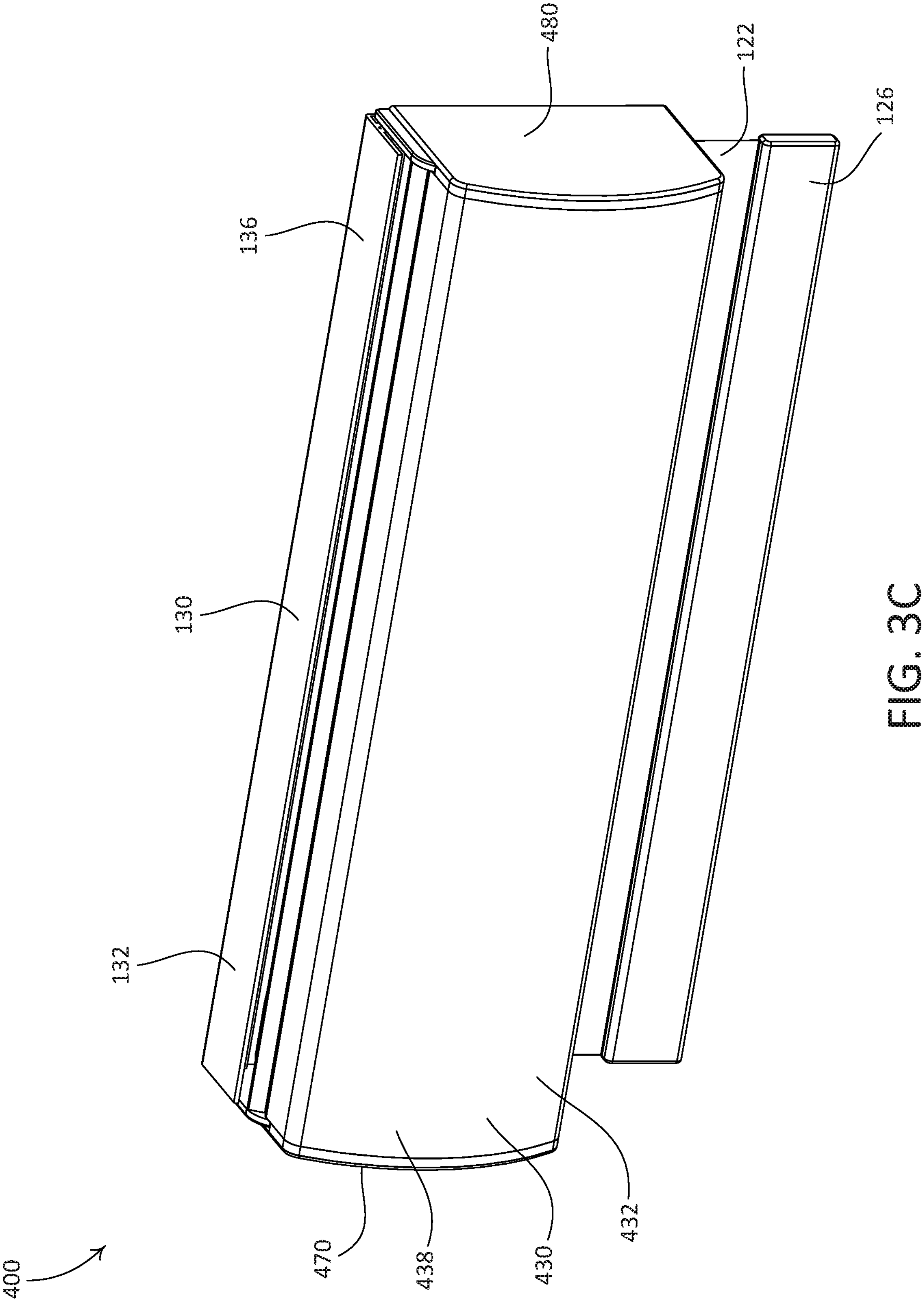
FIG. 3C is a perspective view of the example battery-powered roller shade depicted in FIG. 3A, with the shade in the raised position, the battery compartment in a closed position, and the fascia raised.
Figure 3D:
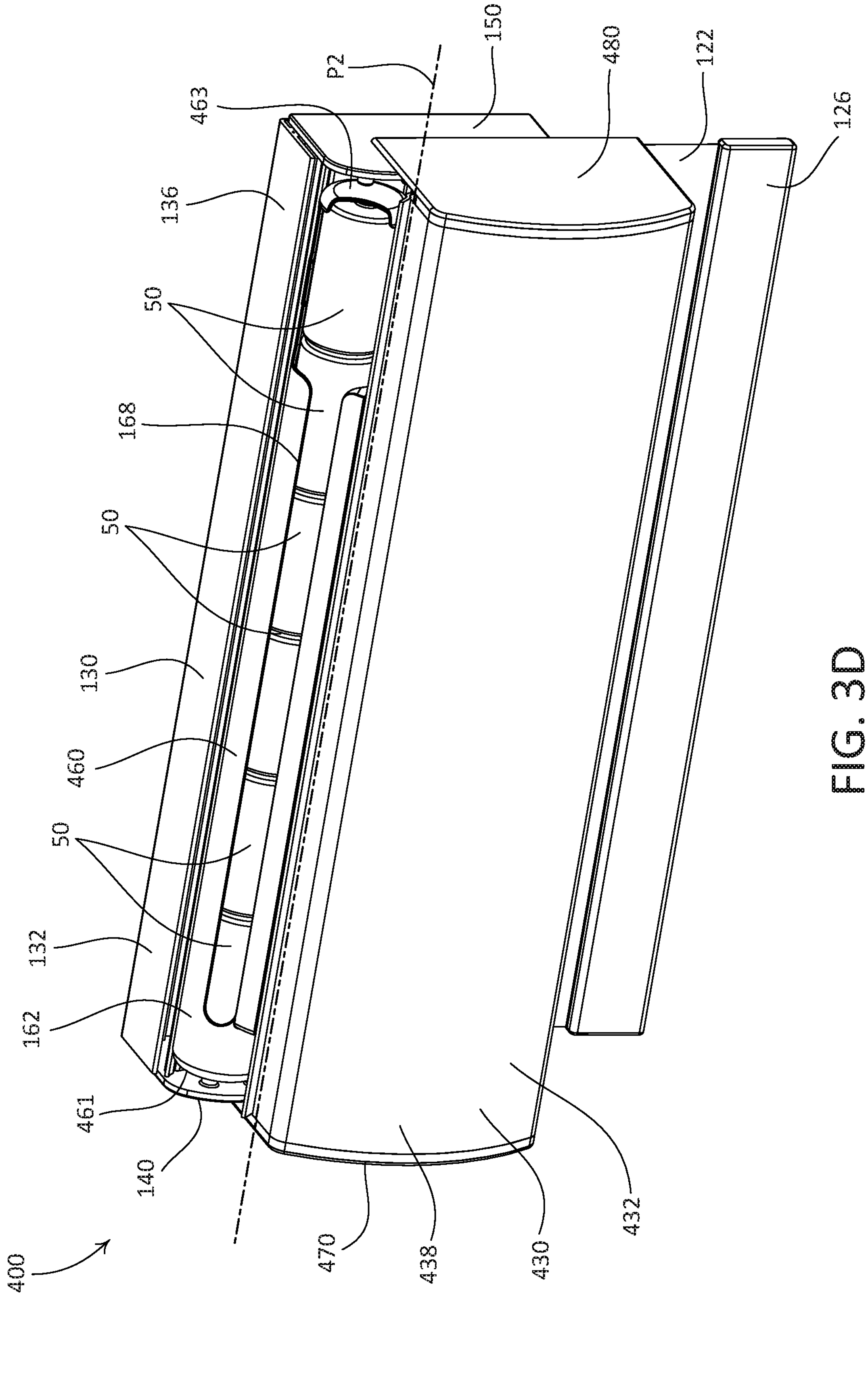
FIG. 3D is a perspective view of the example battery-powered roller shade depicted in FIG. 3A, with the shade in the raised position, the battery compartment in an opened position, and the fascia lowered.
Figure 3E:
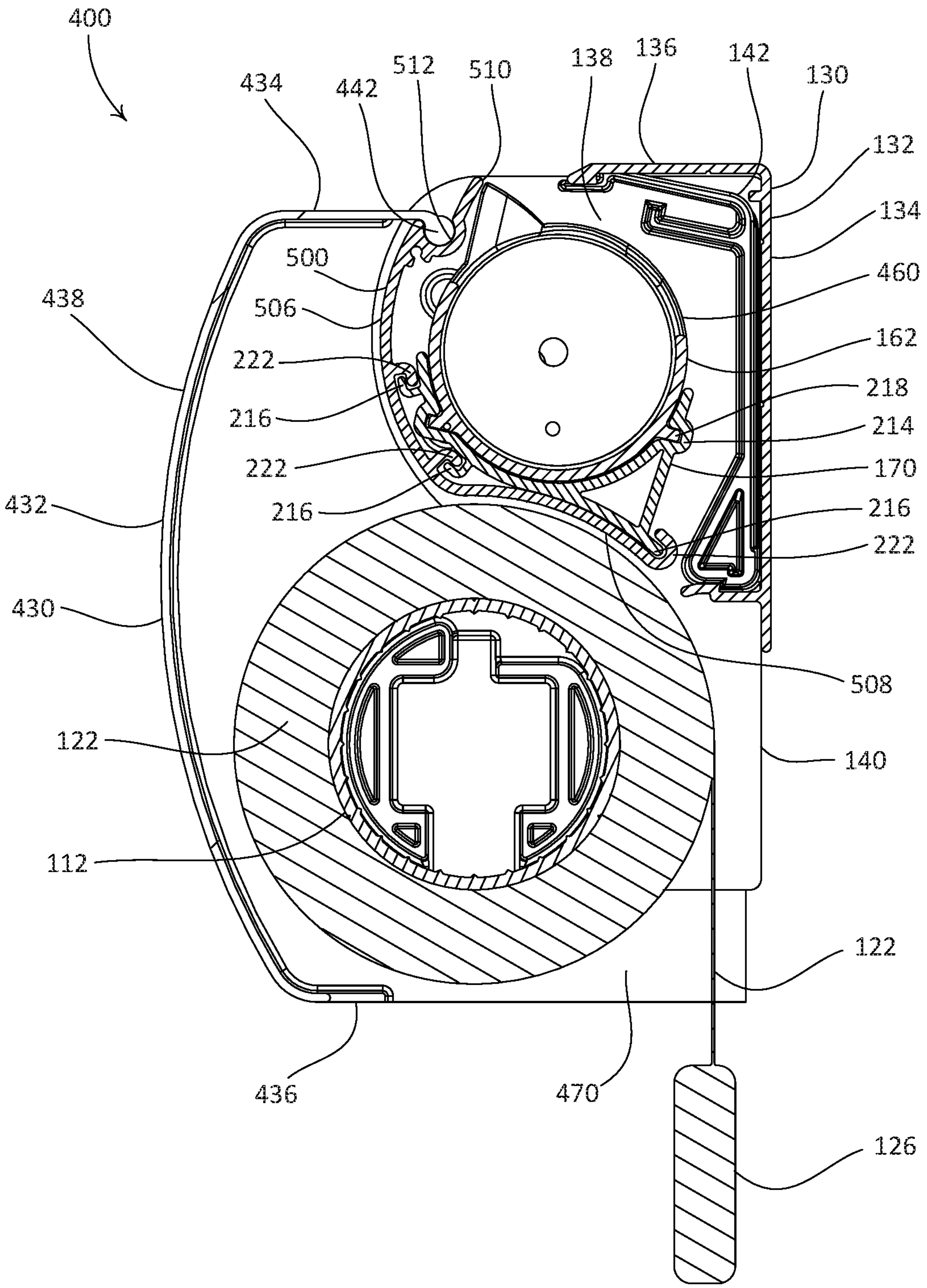
FIG. 3E is a side section view of the example battery-powered roller shade depicted in FIG. 3A, with the shade in the raised position, the battery compartment in a closed position, and the fascia raised.

As shown, the front wall 438 has a height (e.g., as defined by the upper wall 434 and the lower wall 436) such that the lower wall 436 extends below the roller tube 112 and the portion of the shade fabric 122 that is wound onto the roller tube 112 when the shade fabric 122 is in the raised position (e.g., as shown in FIG. 3E). As shown, the first and second end caps 470, 480 may conform to the curvature of the front wall 438, and may be configured to cover the first and second housing brackets 140, 150, respectively, of the housing 130 when the battery compartment 460 is in the closed position. It should be appreciated that the fascia 430 is not limited to the illustrated curvature and/or height of the front wall 438, or to the respective configurations of the first and second end caps 470, 480.

The components of the fascia 430 may be made of any suitable material or combination of materials. For example, the cover 432, the first end cap 470, and the second end cap 480 may be made of plastic. Although the illustrated fascia 430 includes separate components, it should be appreciated that the fascia 430 may be otherwise constructed. For example, the cover 432, the first end cap 470, and the second end cap 480 may be monolithic. One or more components of the fascia 430 (e.g., one or more of the cover 432, the first end cap 470, or the second end cap 480) may be wrapped in a material (e.g., fabric), for instance to enhance the aesthetics of the fascia 430.

Figure 3F:
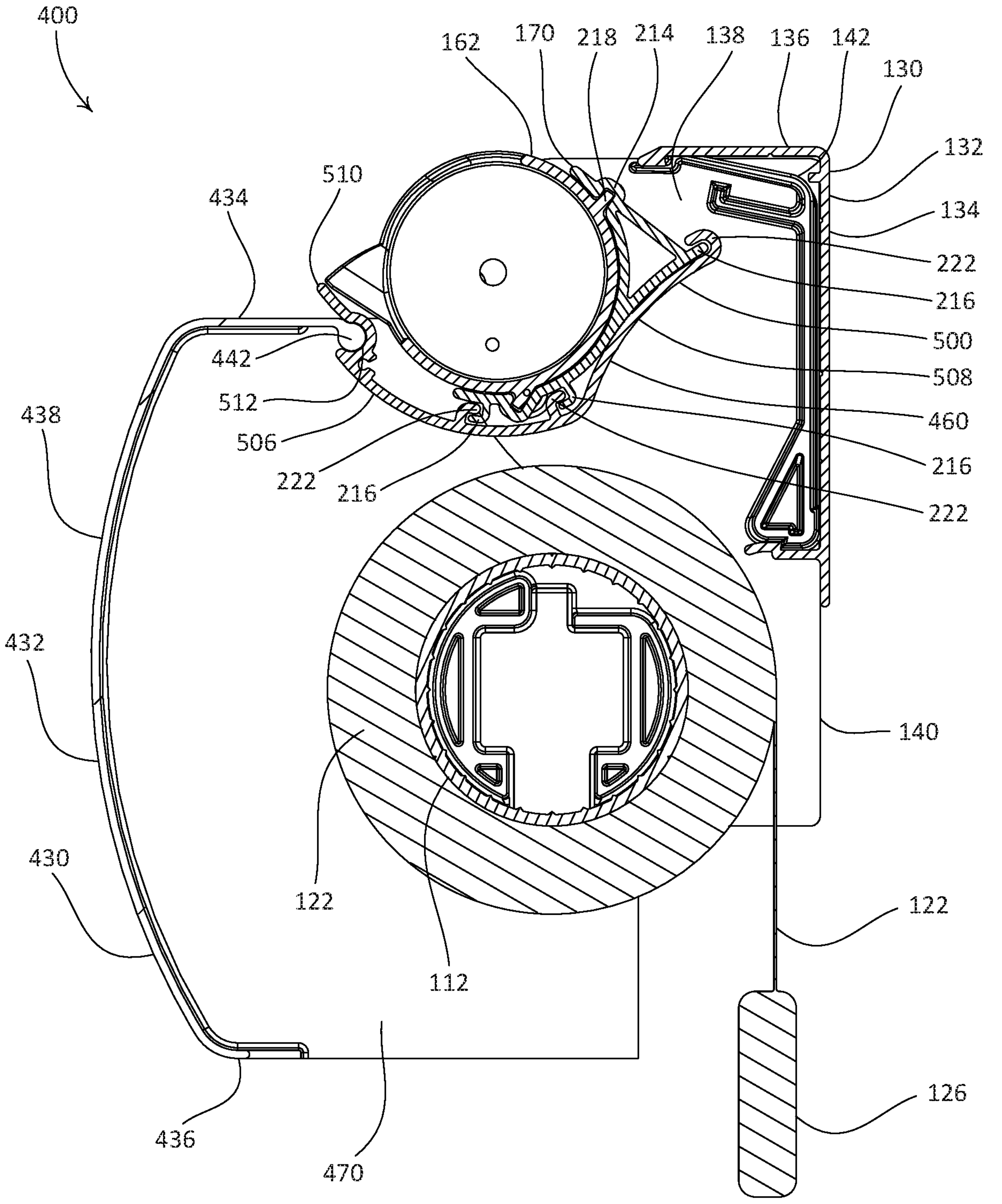
FIG. 3F is a side section view of the example battery-powered roller shade depicted in FIG. 3A, with the shade in the raised position, the battery compartment in an opened position, and the fascia lowered.

In an example of operating the battery compartment 460 of the battery-powered roller shade 400 from the closed position to the opened position, a force may be applied to the battery compartment 460 (e.g., to the cover 432 of the fascia 430 and/or to the upper edge 510 of the front wall 506 of the cover 500) to cause the battery compartment 460 to pivot about the posts 146, 156 of the housing 130. As the battery compartment 460 pivots out of the cavity 138 about the pivot axis P1, the projections 148, 158 of the housing 130 move in the slots 186, 196 of the support 170 (e.g., from the first ends 187, 197 toward the second ends 189, 199, respectively), and the battery holder 162 gradually becomes exposed. As the battery compartment 460 pivots forward about the pivot axis P1, the fascia 430 pivots downward and away from the battery compartment 460 about the pivot axis P2, such that the fascia 430 does not contact the roller tube 112 or the shade fabric 122. As the battery compartment 460 pivots into the opened position, the projections 148, 158 may abut the second ends 189, 199 of the slots 186, 196. With the battery compartment 460 in the opened position (e.g., as shown in FIG. 3F), the access aperture 167 and the slot 168 are exposed, such that one or more batteries 50 may be inserted into, or removed from, the channel 166 (e.g., via the access aperture 167).

With the battery compartment 460 in the opened position, one or more batteries 50 may be replaced (e.g., if the batteries 50 are drained). A first battery 50 that is disposed at the access aperture 167 may be removed from the channel 166 by lifting the first battery 50 out of the channel 166 past the retention tabs 169. At the access aperture 167, one battery 50 at a time may be removed from the battery compartment 460, and thus from the housing 130 of the battery-powered roller shade 400, without interfering with the housing 130, the roller tube 112, or the shade fabric 122. With the first battery 50 removed, a second battery 50 may be removed from the channel 166 by sliding the second battery 50 along the channel 166 toward the access aperture 167 (e.g., by using a finger disposed in the slot 168). When the second battery 50 reaches the access aperture 167, it may be removed from the channel 166 (e.g., similarly to the first battery 50). This process of removing the second battery 50 may be repeated for one or more additional batteries 50 (e.g., all remaining batteries 50). When a desired number of batteries 50 have been removed from the channel 166, one or more fresh batteries 50 (e.g., replacement batteries) may be disposed into the channel 166 past the retention tabs 169 and slid into position in the battery holder 162 (e.g., using the slot 168). When the battery holder 162 is filled with batteries 50, the battery compartment 460 may be operated from the opened position to the closed position.

In an example of operating the battery compartment 460 from the opened position to the closed position, a force may be applied to the battery compartment 460 (e.g., to the cover 432 of the fascia 430 and/or to the upper edge 510 of the front wall 506 of the cover 500) to cause the battery compartment 460 to pivot about the posts 146, 156 of the housing 130. As the battery compartment 460 pivots into the cavity 138 about the pivot axis P1, the projections 148, 158 of the housing 130 move in the slots 186, 196 of the support 170 (e.g., from the second ends 189, 199 toward the first ends 187, 197, respectively), and the battery holder 162 is gradually concealed in the housing 130. As the battery compartment 460 pivots rearward about the pivot axis P1, the fascia 430 pivots upward and toward the battery compartment 460 about the pivot axis P2, and the first and second end caps 470, 480, slide past the first and second housing brackets 140, 150 respectively. As the battery compartment 460 pivots into the closed position, the projections 148, 158 may abut the first ends 187, 197 of the slots 186, 196.

The battery compartment 460 may be easily operated between the closed and opened positions. For example, an individual may operate the battery compartment 460 between the opened and closed positions using a single hand. Additionally, one or more batteries 50 may be removed from, or inserted into, the battery compartment 460 using a single hand. Such one-handed operation of the battery compartment 460 may enable the individual to freely use their other hand while replacing one or more batteries 50, for instance to brace himself or herself on a ladder.

Figure 4A:
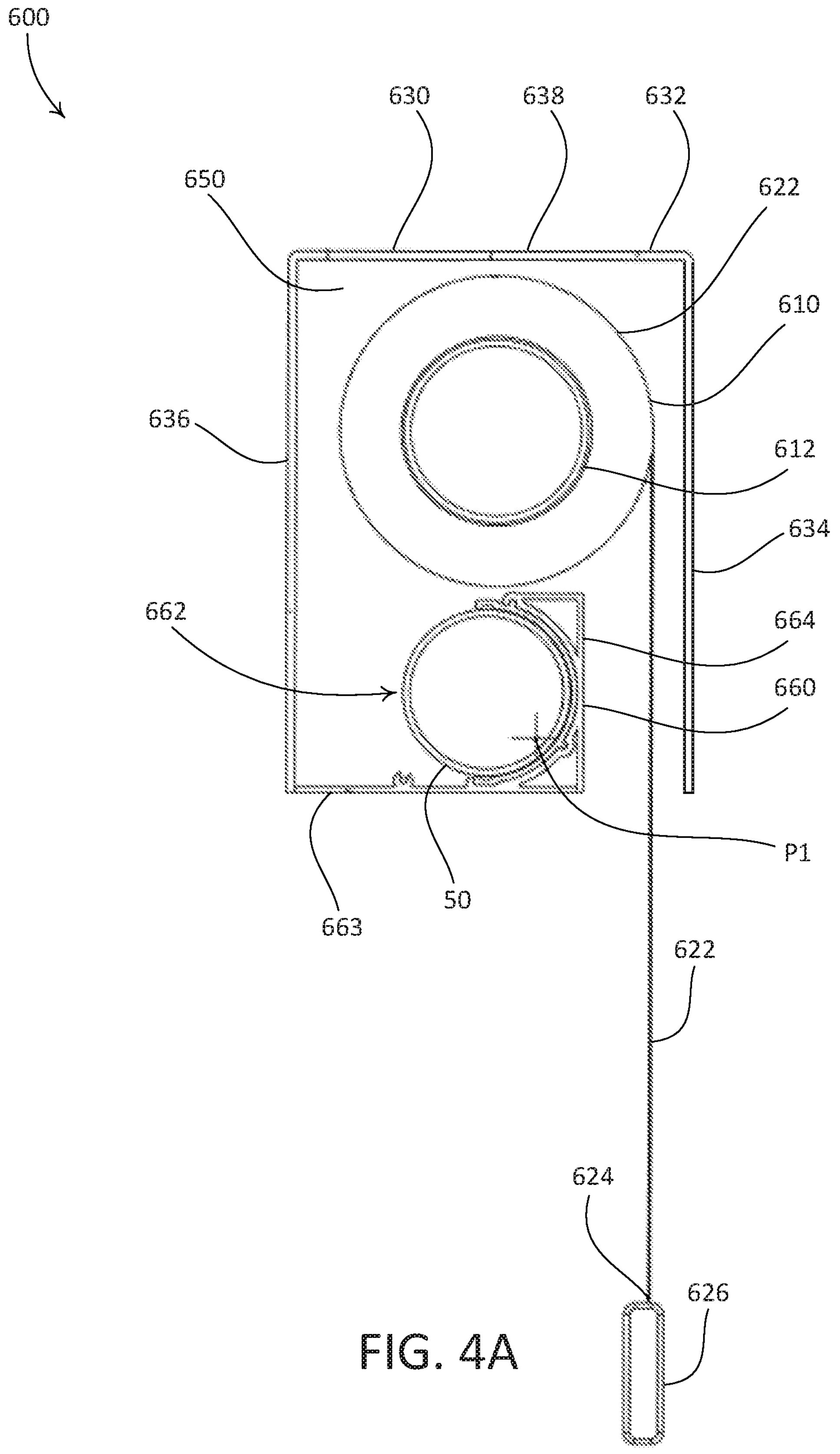
FIG. 4A is a side view of another example battery-powered roller shade having an integrated, accessible battery compartment, with the battery compartment in a closed position.
Figure 4B:
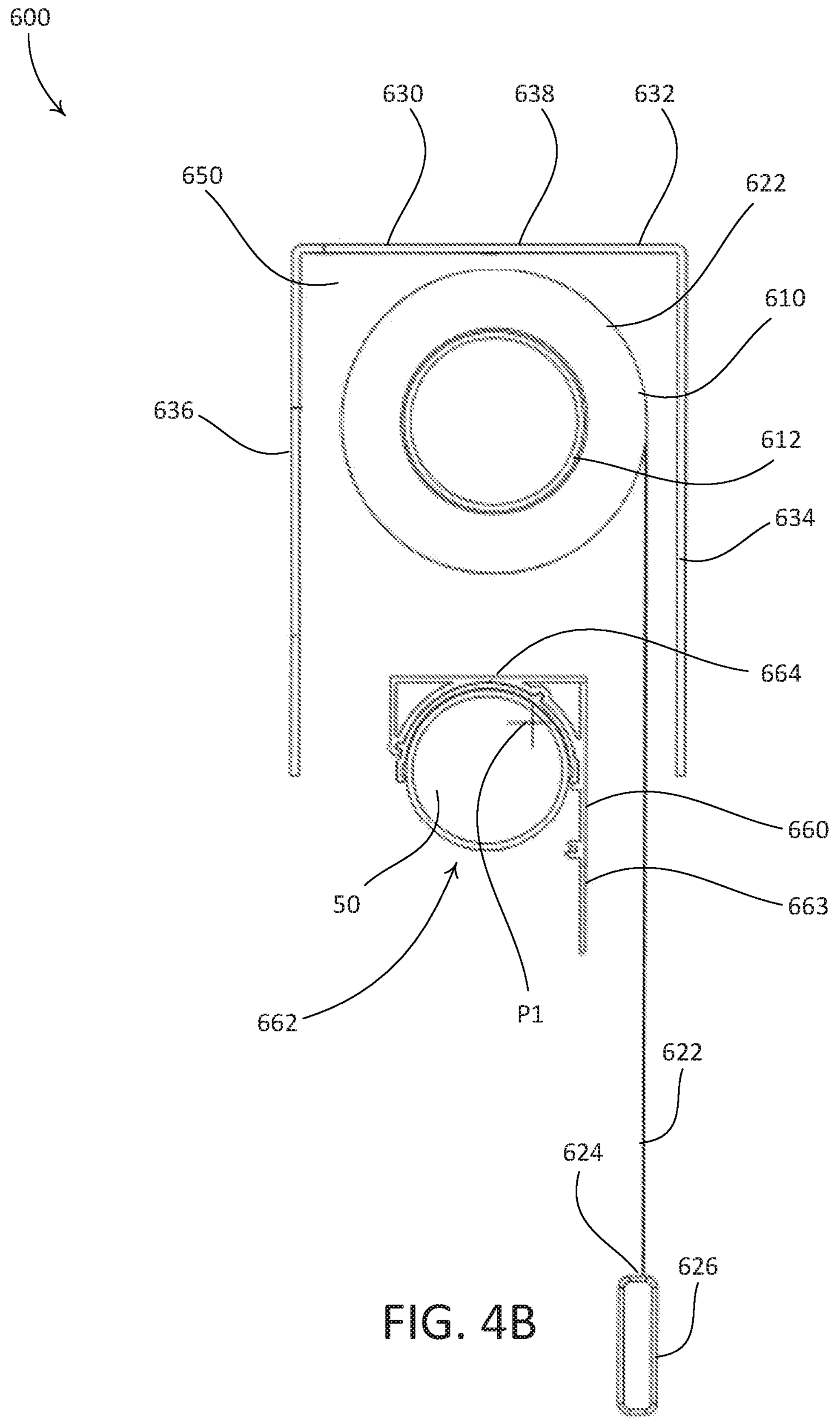
FIG. 4B is a side view of the example battery-powered roller shade depicted in FIG. 4A, with the battery compartment in an opened position.

FIGS. 4A and 4B depict an example battery-powered roller shade 600 that may be mounted in front of an opening, such as one or more windows, to prevent sunlight from entering a space and/or to provide privacy. The battery-powered roller shade 600 may be mounted to a structure that is proximate to the opening, such as a window frame, a wall, or other structure. As shown, the battery-powered roller shade 600 includes a shade assembly 610, a battery compartment 660, and a housing 630 that may be configured to support the shade assembly 610 and the battery compartment 660. The battery compartment 660 may be configured to retain one or more batteries 50.

The illustrated shade assembly 610 includes a roller tube 612, a motor drive unit (not shown), a shade fabric 622, and a hembar 626. The motor drive unit may be configured similarly to, and may function similarly to, for example, the motor drive unit 118. The roller tube 612 may be made of any suitable material, such as metal. The motor drive unit may be operably coupled to the roller tube 612, such that operation of the motor drive unit causes the roller tube 612 to rotate. The shade fabric 622 may define an upper end (not shown) that is attached to the roller tube 612, and an opposed lower end 624.

Rotation of the roller tube 612, for example by the motor drive unit, may cause the shade fabric 622 to wind onto, or to unwind from, the roller tube 612. Rotation of the roller tube 612 in a first direction may cause the shade fabric 622 to unwind from the roller tube 612, for example as the shade fabric 622 is operated to a lowered position relative to an opening (e.g., a window). Rotation of the roller tube 612 in a second direction that is opposite the first direction may cause the shade fabric 622 to wind onto the roller tube 612, for example as the shade fabric 622 is operated to a raised position relative to the opening. The shade fabric 622 may be made of any suitable material, or combination of materials. For example, the shade fabric 622 may be made from one or more of "scrim," woven cloth, non-woven material, light-control film, screen, or mesh. The hembar 626 may be attached to the lower end 624 of the shade fabric 622, and may be weighted, such that the hembar 626 causes the shade fabric 622 to hang (e.g., vertically) in front of one or more windows.

The battery-powered roller shade 600 may include an antenna (not shown) that is configured to receive wireless signals (e.g., RF signals from a remote control device). The antenna may be in electrical communication with the motor drive unit (e.g., via a control circuit or PCB). The antenna may be integrated with (e.g., pass through, be enclosed within, and/or be mounted to) one or more of the shade assembly 610, the housing 630, the battery compartment 660, or respective components thereof.

As shown, the housing 630 includes a rail 632 that defines a rear wall 634, a front wall 636 that is spaced from the rear wall 634, and an upper wall 638 that extends from the rear wall 634 to the front wall 636. The housing 630 may include first and second housing brackets (not shown) that are configured to attach to opposed ends of the rail 632. The rail 632 may be elongate between the opposed ends. The rail 632 and the first and second housing brackets may be configured to attach to one another in an assembled configuration. The components of the housing 630 may be made of any suitable material or combination of materials. For example, the rail 632 may be made of metal and the first and second housing brackets may be made of plastic. Alternatively, the rail 632 and the first and second housing brackets may be a monolithic.

The rail 632 and the first and second housing brackets, when in an assembled configuration, may define a cavity 650. The housing 630 may be configured to support one or both of the shade assembly 610 and the battery compartment 660 (e.g., in the cavity 650). For example, the first and second housing brackets may be configured to support the shade assembly 610 and the battery compartment 660 such that the battery compartment 660 is located (e.g., is oriented) below the shade assembly 610 when the battery-powered roller shade 600 is mounted to a structure. It should be appreciated the battery-powered roller shade 600 is not limited to the illustrated orientation of the shade assembly 610 and the battery compartment 660. The housing 630 may be configured to pivotally support the battery compartment 660, such that the battery compartment 660 may pivot about a pivot axis P1 between an opened position and a closed position. One or more components of the housing 630 may be configured to be mounted to a structure (e.g., to a window frame).

The battery compartment 660 may be configured to hold (e.g., to retain) one or more batteries 50. The battery compartment 660, when supported by the housing 630, may be operated between an opened position and a closed position, for example by causing the battery compartment 660 to pivot about the pivot axis P1. When the battery compartment 660 is in the closed position (e.g., as shown in FIG. 4A), the one or more batteries 50 held by the battery compartment 660 are concealed from view. When the battery compartment 660 is in the opened position (e.g., as shown in FIG. 4B), the one or more batteries 50 held by the battery compartment are accessible, such that one or more batteries 50 may be removed from, or disposed into, the battery compartment 660. The battery compartment 660 may be operated between the opened and closed positions when the battery-powered roller shade 600 is in an assembled configuration and is mounted to a structure.

The battery compartment 660 may define an opening through which a battery 50 may be removed from, or inserted into, the battery compartment 660. For example, as shown, the battery compartment 660 defines an access aperture 662 through which a battery 50 may be removed from, or inserted into, the battery compartment 660. When the battery compartment 660 is in the closed position, the access aperture 662 may be disposed in the cavity 650 and hidden from view (e.g., as shown in FIG. 4A). When the battery compartment 660 is in the opened position, the access aperture 662 may be external to the cavity 650 and accessible (e.g., as shown in FIG. 4B), such that one or more batteries 50 may be disposed into, or removed from, the battery compartment 660.

As shown, the battery compartment 660 includes a first wall 663 that extends to the front wall 636 of the housing 630 when the battery compartment 660 is in the closed position, and a second wall 664 that extends upward from the first wall 663, into the cavity 650, when the battery compartment 660 is in the closed position. As the battery compartment 660 is operated from the closed position to the opened position, the first wall 663 may pivot downward and away from the front wall 636 of the housing 630. When the battery compartment 660 is in the closed position, the first wall 663 may define a lower wall of the housing 630, and may conceal the shade assembly 610, a portion of the shade fabric 622 that is wound onto the roller tube 612, the battery compartment 660, one or more batteries 50 disposed in the battery compartment 660, and one or more portions of the cavity 650 and/or the housing 630 that may otherwise be visible if the first wall 663 was absent.

Figure 5A:
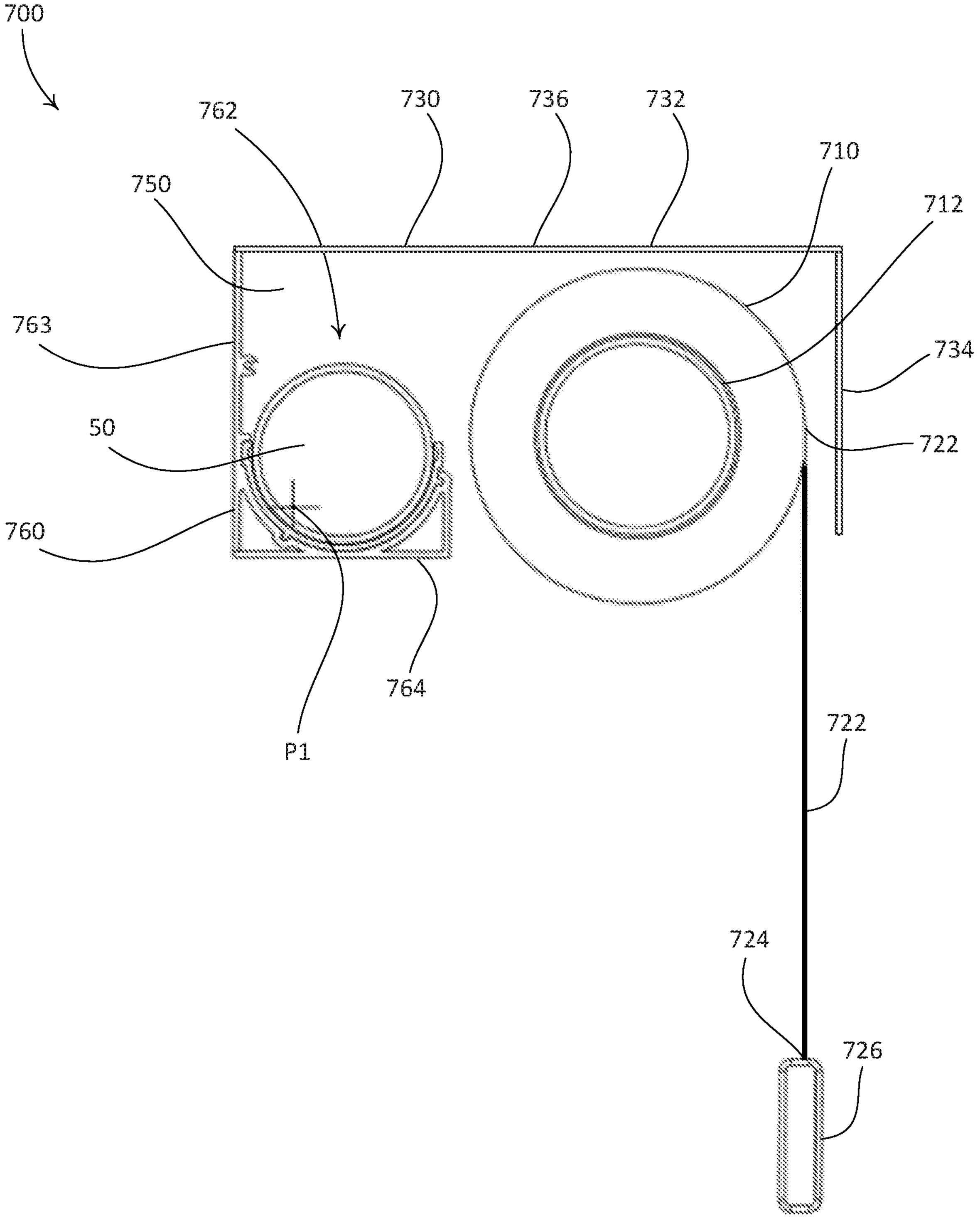
FIG. 5A is a side view of another example battery-powered roller shade having an integrated, accessible battery compartment, with the battery compartment in a closed position.
Figure 5B:
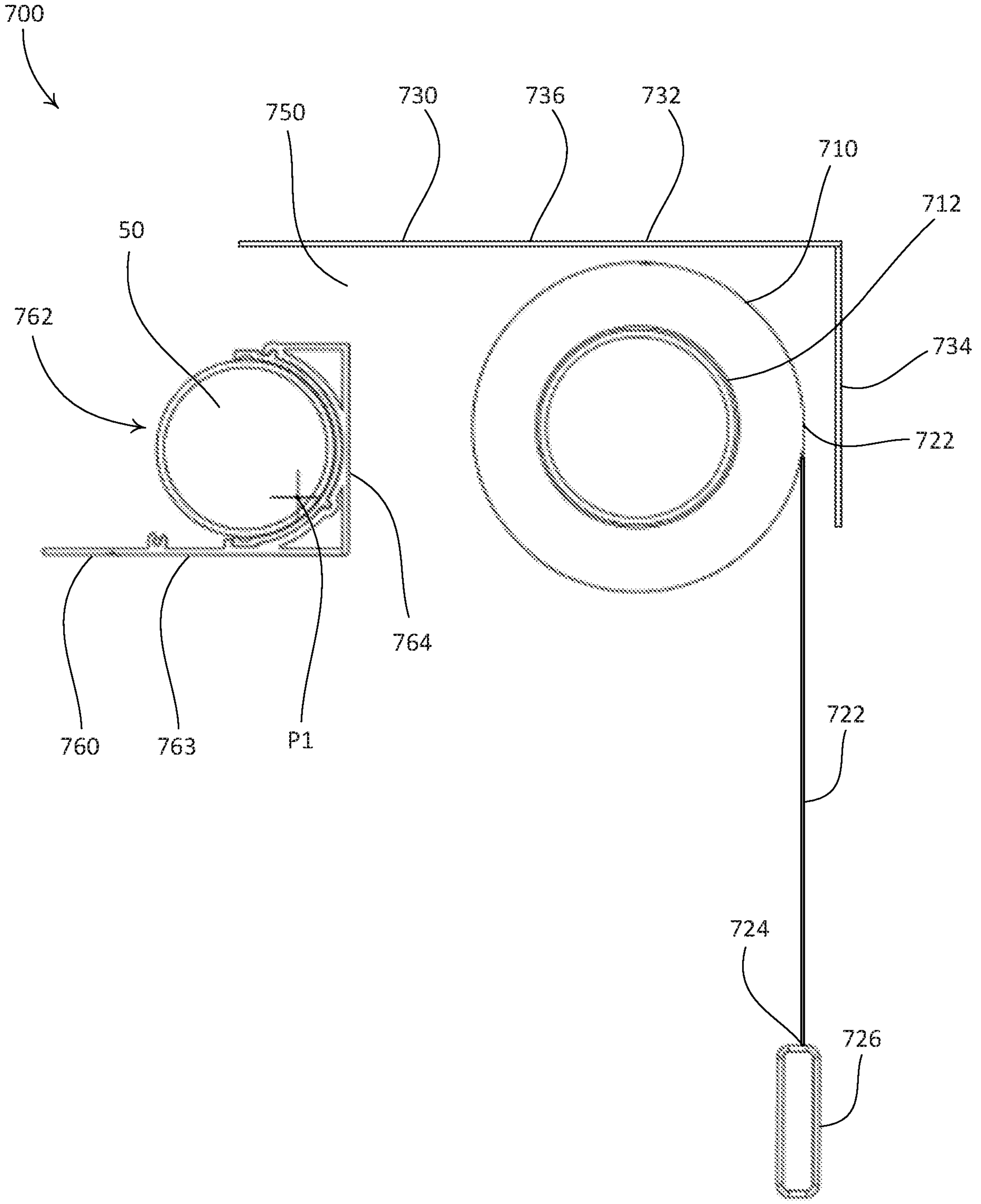
FIG. 5B is a side view of the example battery-powered roller shade depicted in FIG. 5A, with the battery compartment in an opened position.

FIGS. 5A and 5B depict an example battery-powered roller shade 700 that may be mounted in front of an opening, such as one or more windows, to prevent sunlight from entering a space and/or to provide privacy. The battery-powered roller shade 700 may be mounted to a structure that is proximate to the opening, such as a window frame, a wall, or other structure. As shown, the battery-powered roller shade 700 includes a shade assembly 710, a battery compartment 760, and a housing 730 that may be configured to support the shade assembly 710 and the battery compartment 760. The battery compartment 760 may be configured to retain one or more batteries 50.

The illustrated shade assembly 710 includes a roller tube 712, a motor drive unit (not shown), a shade fabric 722, and a hembar 726. The motor drive unit may be configured similarly to, and may function similarly to, for example, the motor drive unit 118. The roller tube 712 may be made of any suitable material, such as metal. The motor drive unit may be operably coupled to the roller tube 712, such that operation of the motor drive unit causes the roller tube 712 to rotate. The shade fabric 722 may define an upper end (not shown) that is attached to the roller tube 712, and an opposed lower end 724.

Rotation of the roller tube 712, for example by the motor drive unit, may cause the shade fabric 722 to wind onto, or to unwind from, the roller tube 712. Rotation of the roller tube 712 in a first direction may cause the shade fabric 722 to unwind from the roller tube 712, for example as the shade fabric 722 is operated to a lowered position relative to an opening (e.g., a window). Rotation of the roller tube 712 in a second direction that is opposite the first direction may cause the shade fabric 722 to wind onto the roller tube 712, for example as the shade fabric 722 is operated to a raised position relative to the opening. The shade fabric 722 may be made of any suitable material, or combination of materials. For example, the shade fabric 722 may be made from one or more of "scrim," woven cloth, non-woven material, light-control film, screen, or mesh. The hembar 726 may be attached to the lower end 724 of the shade fabric 722, and may be weighted, such that the hembar 726 causes the shade fabric 722 to hang (e.g., vertically) in front of one or more windows.

The battery-powered roller shade 700 may include an antenna (not shown) that is configured to receive wireless signals (e.g., RF signals from a remote control device). The antenna may be in electrical communication with the motor drive unit (e.g., via a control circuit or PCB). The antenna may be integrated with (e.g., pass through, be enclosed within, and/or be mounted to) one or more of the shade assembly 710, the housing 730, the battery compartment 760, or respective components thereof.

As shown, the housing 730 includes a rail 732 that defines a rear wall 734 and an upper wall 736 that extends forward from the rear wall 734. The housing 730 may include first and second housing brackets (not shown) that are configured to attach to opposed ends of the rail 732. The rail 732 may be elongate between the opposed ends. The rail 732 and the first and second housing brackets may be configured to attach to one another in an assembled configuration. The components of the housing 730 may be made of any suitable material or combination of materials. For example, the rail 732 may be made of metal and the first and second housing brackets may be made of plastic. Alternatively, the rail 732 and the first and second housing brackets may be a monolithic.

The rail 732 and the first and second housing brackets, when in an assembled configuration, may define a cavity 750. The housing 730 may be configured to support one or both of the shade assembly 710 and the battery compartment 760 (e.g., in the cavity 750). For example, the first and second housing brackets may be configured to support the shade assembly 710 and the battery compartment 760 such that the battery compartment 760 is located (e.g., is oriented) in front of the shade assembly 710 (e.g., further from the rear wall 734 of the housing 730 than the shade assembly 710) when the battery-powered roller shade 700 is mounted to a structure. It should be appreciated the battery-powered roller shade 700 is not limited to the illustrated orientation of the shade assembly 710 and the battery compartment 760. The housing 730 may be configured to pivotally support the battery compartment 760, such that the battery compartment 760 may pivot about a pivot axis P1 between an opened position and a closed position. One or more components of the housing 730 may be configured to be mounted to a structure (e.g., to a window frame).

The battery compartment 760 may be configured to hold (e.g., to retain) one or more batteries 50. The battery compartment 760, when supported by the housing 730, may be operated between an opened position and a closed position, for example by causing the battery compartment 760 to pivot about the pivot axis P1. When the battery compartment 760 is in the closed position (e.g., as shown in FIG. 5A), the one or more batteries 50 held by the battery compartment 760 are concealed from view. When the battery compartment 760 is in the opened position (e.g., as shown in FIG. 5B), the one or more batteries 50 held by the battery compartment are accessible, such that one or more batteries 50 may be removed from, or disposed into, the battery compartment 760. The battery compartment 760 may be operated between the opened and closed positions when the battery-powered roller shade 700 is in an assembled configuration and is mounted to a structure.

The battery compartment 760 may define an opening through which a battery 50 may be removed from, or inserted into, the battery compartment 760. For example, as shown, the battery compartment 760 defines an access aperture 762 through which a battery 50 may be removed from, or inserted into, the battery compartment 760. When the battery compartment 760 is in the closed position, the access aperture 762 may be disposed in the cavity 750 and hidden from view (e.g., as shown in FIG. 5A). When the battery compartment 760 is in the opened position, the access aperture 762 may be external to the cavity 750 and accessible (e.g., as shown in FIG. 5B), such that one or more batteries 50 may be disposed into, or removed from, the battery compartment 760.

As shown, the battery compartment 760 includes a first wall 763 that extends to the upper wall 736 of the housing 730 when the battery compartment 760 is in the closed position, and a second wall 764 that extends inward from the first wall 763 toward the rear wall 734 of the housing 730 when the battery compartment 760 is in the closed position. As the battery compartment 760 is operated from the closed position to the opened position, the first wall 763 may pivot downward and away from the upper wall 736 of the housing 730. When the battery compartment 760 is in the closed position, the first wall 763 may define a front wall of the housing 730 and the second wall 764 may define a lower wall of the housing 730. When the battery compartment 760 is in the closed position, the first and second walls 763, 764 may at least partially conceal the shade assembly 710, a portion of the shade fabric 722 that is wound onto the roller tube 712, the battery compartment 760, one or more batteries 50 disposed in the battery compartment 760, and one or more portions of the cavity 750 and/or the housing 730 that may otherwise be visible if the first and second walls 763, 764 were absent.

Figure 6:
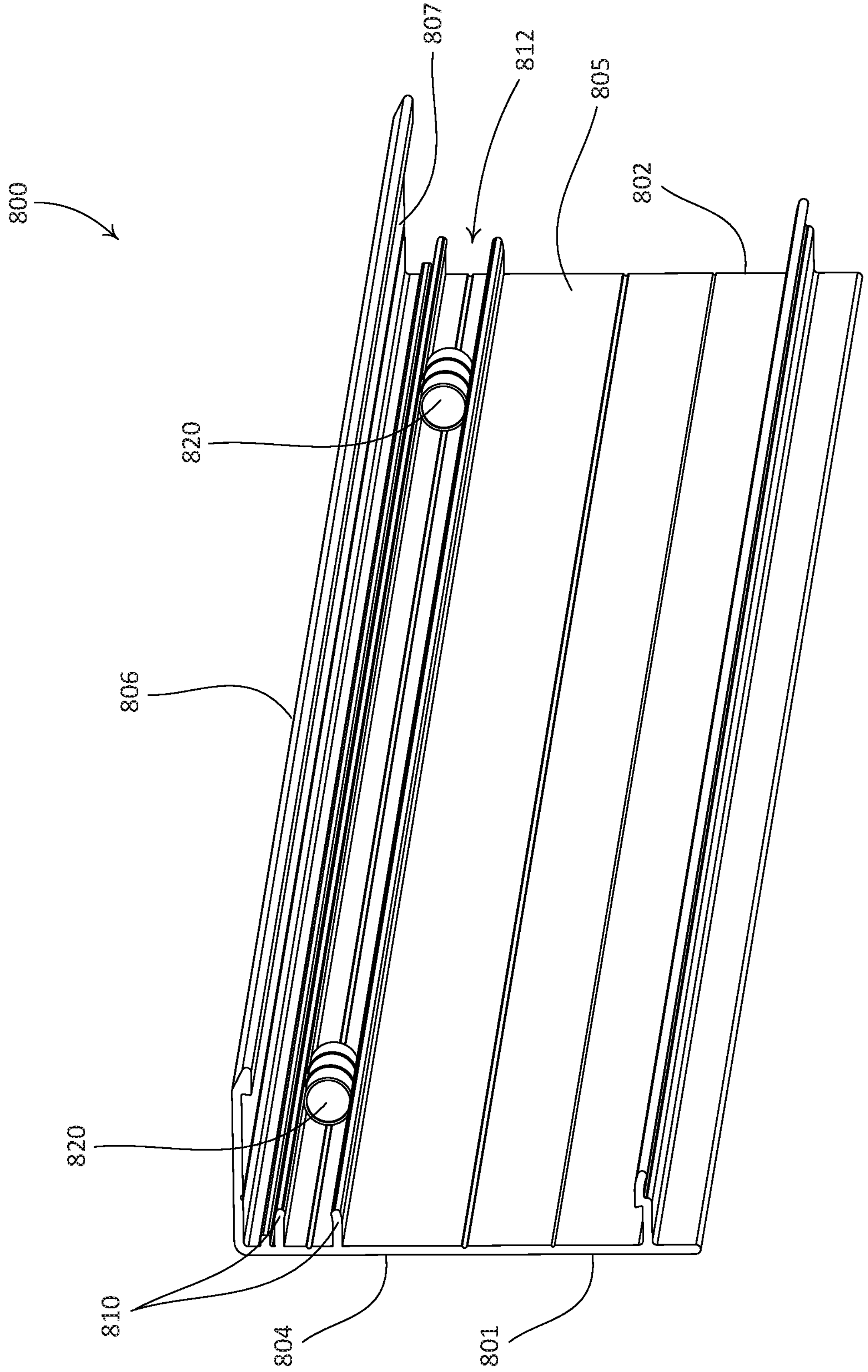
FIG. 6 is a perspective view of an example housing that may be integrated with a window treatment, the housing including two integrated alignment instruments.

FIG. 6 depicts an example rail 800 that may be configured to assist with aligning a motorized window treatment relative to a structure, for example while mounting the motorized window treatment to the structure. The rail 800 may be integrated into a battery-powered roller shade, such as the example battery-powered roller shades 100, 300, 400, 600, and 700 illustrated and described herein. To illustrate, the rail 800 may be substituted for the rail 132 in an assembled configuration of the housing 130 of the example battery-powered roller shade 100.

The rail 800 may include one or more instruments that display an alignment of a surface of the rail 800 relative to a structure (e.g., a window frame, a wall, or other structure). The rail 800, when included in the assembled configuration of the housing of a battery-powered roller shade, for example, may indicate whether the housing is horizontally aligned (e.g., level) relative to a structure, and/or is vertically aligned (e.g., plumb) relative to the structure. As shown, the rail 800 includes two levels 820 that are attached to the rail 800. The levels 820 may include, for example, spirit levels, bubble levels, laser levels, or other devices that are configured to indicate level of a surface, in any combination. It should be appreciated that the rail 800 may include more or fewer levels 820.

As shown, the rail 800 is elongate between a first end 801 and an opposed second end 802. The rail 800 includes a rear wall 804 that may be configured to be mounted to a structure, and an upper wall 806 that extends outward from an upper edge of the rear wall 804 along a direction that is substantially normal to the rear wall 804. The rear wall 804 and the upper wall 806 may define respective inner surfaces 805, 807, to which one or more levels 820 may be attached. For example, as shown, the rear wall 804 defines a retention clip 810 that extends outward from the inner surface 805 of the rear wall 804. The retention clip 810 includes opposed walls that are spaced apart from each other such that a level 820 may be securely snapped into place in the retention clip 810 at a location along the rear wall 804. In this regard, if the rail 800 is used in an assembled configuration of the housing of a battery-operated roller shade, such as the example battery-powered roller shades 100, 300, 400, 600, and 700 illustrated and described herein, one or more levels 820 attached to the rear wall 804 are disposed in the cavity of the housing of the battery-operated roller shade.

The illustrated retention clip 810 extends along a length of the rear wall 804, from the first end 801 to the second end 802, such that the retention clip 810 defines a channel 812 into which one or more levels 820 may be secured. As shown, a first level 820 is secured in the channel 812 near the first end 801, and a second level 820 is secured in the channel 812 near the second end 802. The retention clip 810 may be configured to securely retain the levels 820, such that the levels 820 are not moveable in the channel 812, or are not removable from the retention clip 810. Alternatively, the retention clip 810 may be configured such that the levels 820 may be moved (e.g., slid) in the channel 812, or may be easily removed from the retention clip 810. In such a configuration, one or both levels 820 may be removed, for example after the rail 800 has been mounted, and may be reused in mounting a second rail 800 (e.g., inserted into a retention clip 810 of the second rail 800).

It should be appreciated that the rail 800 is not limited to the illustrated retention clip 810 configuration. For example, the rail 800 may be alternatively configured such that the rear wall 804 defines one or more short retention clip 810 sections, for example at predetermined locations along the rear wall 804. In another example, one or more retention clip 810 sections (e.g., a channel 812) may be defined by another surface of the rail 800, such as the inner surface 807 of the upper wall 806. It should further be appreciated that the rail 800 is not limited to the illustrated locations or number of levels 820, and that the rail 800 may be alternatively configured with more or fewer levels 820, in the same or alternate locations. The rail 800 may include one or more openings (not shown) that are configured to allow viewing of one or more levels 820 attached to the rail 800 (e.g., in the channel 812). For example, one or more openings may be defined in the upper wall 806, and/or at any other suitable location on the rail 800.

Figure 7:
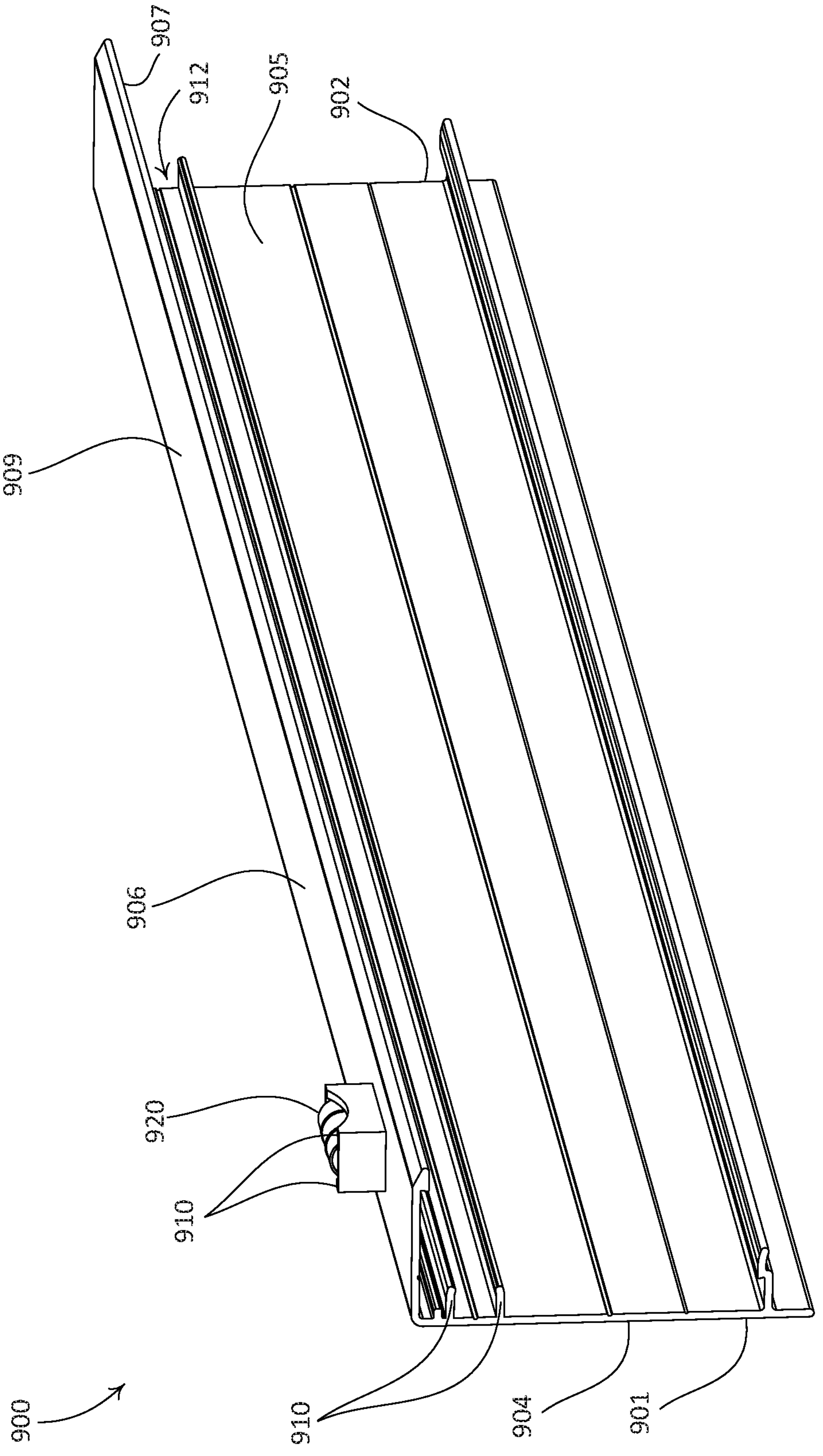
FIG. 7 is a perspective view of another example housing that may be integrated with a window treatment, the housing including an integrated alignment instrument.

FIG. 7 depicts another example rail 900 that may be configured to assist with aligning a motorized window treatment relative to a structure, for example while mounting the motorized window treatment to the structure. The rail 900 may be integrated into a battery-powered roller shade, such as the example battery-powered roller shades 100, 300, 400, 600, and 700 illustrated and described herein. To illustrate, the rail 900 may be substituted for the rail 132 in an assembled configuration of the housing 130 of the example battery-powered roller shade 100.

The rail 900 may include one or more instruments that display an alignment of a surface of the rail 900 relative to a structure (e.g., a window frame, a wall, or other structure). The rail 900, when included in the assembled configuration of the housing of a battery-powered roller shade, for example, may indicate whether the housing is horizontally aligned (e.g., level) relative to a structure, and/or is vertically aligned (e.g., plumb) relative to the structure. As shown, the rail 900 includes a level 920 that is attached to the rail 900. The level 920 may be, for example, a spirit level, a bubble level, a laser level, or another device that is configured to indicate level of a surface. It should be appreciated that the rail 900 may include more levels 920.

As shown, the rail 900 is elongate between a first end 901 and an opposed second end 902. The rail 900 includes a rear wall 904 that may be configured to be mounted to a structure, and an upper wall 906 that extends outward from an upper edge of the rear wall 904 along a direction that is substantially normal to the rear wall 904. The rear wall 904 and the upper wall 906 may define respective inner surfaces 905, 907, to which one or more levels 920 may be attached. The upper wall 906 may define an outer surface 909 to which one or more levels 920 may be attached. For example, as shown, the rear wall 904 defines a first retention clip 910 that extends outward from the inner surface 905 of the rear wall 904, and the upper wall 906 defines a second retention clip 910 that extends upward from the outer surface 909 of the upper wall 906.

As shown, the first retention clip 910 includes opposed walls that are spaced apart from each other such that a level 920 may be securely snapped into place in the retention clip 910 at a location along the rear wall 904. In this regard, if the rail 900 is used in an assembled configuration of the housing of a battery-operated roller shade, such as the example battery-powered roller shades 100, 300, 400, 600, and 700 illustrated and described herein, one or more levels 920 attached to the rear wall 904 are disposed in the cavity of the housing of the battery-operated roller shade. The first retention clip 910 extends along a length of the rear wall 904, from the first end 901 to the second end 902, such that the retention clip 910 defines a channel 912 into which one or more levels 920 may be secured. The second retention clip 910 includes opposed walls that are spaced apart from each other such that a level 920 may be securely snapped into place in the retention clip 910 at the illustrated location along the upper wall 906, near the first end 901 of the rail 900.

The first retention clip 910 may be configured to securely retain one or more level 920, such that the levels 920 are not moveable in the channel 912, or are not removable from the retention clip 910. Alternatively, the first retention clip 910 may be configured such that one or more levels 920 may be moved (e.g., slid) in the channel 912, or may be removed from the retention clip 910. In such a configuration, a level 920 may be removed, for example after the rail 900 has been mounted, and may be reused in mounting a second rail 900 (e.g., inserted into a retention clip 910 of the second rail 900). The second retention clip 910 may be configured to securely retain a level 920, such that the level 920 is not removable from the retention clip 910. Alternatively, the second retention clip 910 may be configured such that the level 920 may be removed from the retention clip 910. In such a configuration, the level 920 may be removed, for example after the rail 900 has been mounted, and may be reused in mounting a second rail 900 (e.g., inserted into a retention clip 910 of the second rail 900).

It should be appreciated that the rail 900 is not limited to the illustrated retention clip 910 configuration. For example, the rail 900 may be alternatively configured such that the upper wall 906 defines two or more retention clips 910, at any suitable locations. In another example, the rear wall 904 may define one or more short retention clip 910 sections, for example at predetermined locations along the rear wall 904. In still another example, one or more retention clip 910 sections (e.g., a channel 912) may be defined by another surface of the rail 900, such as the inner surface 907 of the upper wall 906. It should further be appreciated that the rail 900 is not limited to the illustrated location or number of levels 920, and that the rail 900 may be alternatively configured with more or fewer levels 920, in the same or alternate locations. The rail 900 may include one or more openings (not shown) that are configured to allow viewing of one or more levels 920 attached to the rail 900 (e.g., in the channel 912). For example, one or more openings may be defined in the upper wall 906, and/or at any other suitable location on the rail 900.

It should be appreciated that the example battery compartments illustrated and described herein (e.g., including the battery compartments 160, 460, 660, and 760) are not limited to use with motorized window treatments having roller shades, and that the example battery compartments may be integrated into motorized window treatments having other types of shade assemblies and/or shades. For instance, the example battery compartments illustrated and described herein may be integrated into motorized window treatments having honeycomb shades, cellular shades, pleated shades, roman shades, venetian blinds, draperies, or the like. It should further be appreciated that the example rails 800 and 900 may be used with any of the example battery-powered roller shades illustrated and described herein (e.g., including the example battery-powered roller shades 100, 300, 400, 600, and 700), and more generally may be adapted for use with window treatments having other types of shade assemblies and/or shades. For instance, the example rails 800 and 900 may be integrated into window treatments having honeycomb shades, cellular shades, pleated shades, roman shades, venetian blinds, draperies, or the like. It should further still be appreciated that the example battery-powered roller shades illustrated and described herein (e.g., including the example battery-powered roller shades 100, 300, 400, 600, and 700) are not limited to use as window treatments, and that the example battery-powered roller shades may be implemented for uses other than covering openings (e.g., windows). For instance, the example battery-powered roller shades may be alternatively configured to function as battery-powered, motorized projection screens (e.g., by replacing the covering material with a projection screen material).

The invention claimed is:

1. A motorized window treatment comprising:

a housing that is configured to be mounted to a structure, the housing having a front wall;

a window treatment assembly that is supported by the housing, wherein the window treatment assembly includes a covering material that is operable between a raised position and a lowered position; and a battery compartment that is configured to hold one or more batteries for powering a drive unit of the window treatment assembly, the battery compartment pivotally supported by the housing along a pivot axis and operable between a closed position and an opened position by pivoting the battery compartment about the pivot axis, the battery compartment comprising a first wall that extends from the front wall of the housing when the battery compartment is in the closed position, the first wall of the battery compartment configured to pivot downward and away from the front wall of the housing as the battery compartment is operated from the closed position to the opened position;

wherein the pivot axis is offset relative to a center line defined by the one or more batteries such that the pivot axis is not coincident with the center line.

2. The motorized window treatment of claim 1, wherein the housing defines a cavity in which the battery compartment is supported when the battery compartment is in the closed position.

3. The motorized window treatment of claim 2, wherein the housing further comprises a rear wall that is spaced from the front wall and an upper wall that extends from the front wall to the rear wall.

4. The motorized window treatment of claim 3, wherein the housing comprises:

a rail that is elongate between opposite ends; and first and second housing brackets configured to be attached to the opposite ends of the rail;

wherein the first and second housing brackets are configured to pivotally support the battery compartment along the pivot axis.

5. The motorized window treatment of claim 2, wherein the battery compartment comprises a second wall the extends upward from the first wall when the battery compartment is in the closed position.

6. The motorized window treatment of claim 1, wherein, when the battery compartment is in the opened position, the one or more batteries are accessible along a direction that is normal to the center line defined by the one or more batteries.

7. The motorized window treatment of claim 1, wherein the first wall of the battery compartment is configured to conceal the one or more batteries from view when the battery compartment is in the closed position.

8. The motorized window treatment of claim 1, wherein the battery compartment is operable between the opened position and the closed position, independently of an amount of the covering material that is lowered.

9. The motorized window treatment of claim 1, wherein the battery compartment defines an access aperture through which a battery may be removed from, or inserted into, the battery compartment.

10. A motorized roller shade comprising:

a housing that is configured to be mounted to a structure, the housing having a front wall;

a roller shade assembly having a shade fabric and a roller tube that is supported by the housing and is attached to an upper end of the shade fabric, wherein rotation of the roller tube about a longitudinal axis causes the shade fabric to move between a raised position and a lowered position; and a battery compartment that is configured to hold one or more batteries for powering a drive unit of the roller shade assembly, the battery compartment pivotally supported by the housing along a pivot axis and operable between a closed position and an opened position by pivoting the battery compartment about the pivot axis, the battery compartment comprising a first wall that extends from the front wall of the housing when the battery compartment is in the closed position, the first wall of the battery compartment configured to pivot downward and away from the front wall of the housing as the battery compartment is operated from the closed position to the opened position;

wherein the pivot axis is offset relative to a center line defined by the one or more batteries such that the pivot axis is not coincident with the center line.

11. The motorized roller shade of claim 10, wherein the housing defines a cavity in which the battery compartment is supported when the battery compartment is in the closed position.

12. The motorized roller shade of claim 11, wherein the housing further comprises a rear wall that is spaced from the front wall and an upper wall that extends from the front wall to the rear wall.

13. The motorized roller shade of claim 12, wherein the housing comprises:

a rail that is elongate between opposite ends; and first and second housing brackets configured to be attached to the opposite ends of the rail;

wherein the first and second housing brackets are configured to pivotally support the battery compartment along the pivot axis.

14. The motorized roller shade of claim 11, wherein the battery compartment comprises a second wall that extends upward from the first wall when the battery compartment is in the closed position.

15. The motorized roller shade of claim 10, wherein, when the battery compartment is in the opened position, the one or more batteries are accessible along a direction that is normal to the center line defined by the one or more batteries.

16. The motorized roller shade of claim 10, wherein the first wall of the battery compartment is configured to conceal the one or more batteries and the roller tube from view when the battery compartment is in the closed position.

17. The motorized roller shade of claim 10, wherein the battery compartment is operable between the opened position and the closed position, independently of an amount of the covering material that is lowered.

18. The motorized roller shade of claim 10, wherein the battery compartment defines an access aperture through which a battery may be removed from, or inserted into, the battery compartment.

* * * * *